(12) United States Patent
Saito

(10) Patent No.: US 11,580,644 B2
(45) Date of Patent: Feb. 14, 2023

(54) INFORMATION PROCESSING METHOD, STORAGE MEDIUM, AND INFORMATION PROCESSING APPARATUS

(71) Applicant: CANON KABUSHIKI KAISHA, Tokyo (JP)

(72) Inventor: Wataru Saito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 400 days.

(21) Appl. No.: 16/919,276

(22) Filed: Jul. 2, 2020

(65) Prior Publication Data

US 2021/0012501 A1     Jan. 14, 2021

(30) Foreign Application Priority Data

Jul. 10, 2019   (JP) .............................. JP2019-128418

(51) Int. Cl.
*G06T 7/10*     (2017.01)
*G06F 3/04842*     (2022.01)
*G06F 3/04845*     (2022.01)

(52) U.S. Cl.
CPC ............ *G06T 7/10* (2017.01); *G06F 3/04842* (2013.01); *G06F 3/04845* (2013.01); *G06T 2207/20101* (2013.01); *G06T 2207/20132* (2013.01)

(58) Field of Classification Search
CPC ............. G06T 7/10; G06T 2207/20101; G06T 2207/20132; G06T 11/00; G06F 3/04842; G06F 3/04845; G06F 3/0482; H04N 1/3873
See application file for complete search history.

(56) References Cited

U.S. PATENT DOCUMENTS

| | | | |
|---|---|---|---|
| 8,498,451 B1* | 7/2013 | Agopian | G06T 11/60 382/118 |
| 8,860,756 B2 | 10/2014 | Boreham et al. | |
| 2009/0034842 A1* | 2/2009 | Grosvenor | H04N 1/3872 382/173 |
| 2010/0053364 A1* | 3/2010 | Mino | H04N 5/222 348/222.1 |
| 2010/0156931 A1 | 6/2010 | Boreham et al. | |
| 2012/0294514 A1* | 11/2012 | Saunders | G06V 20/30 382/218 |

(Continued)

FOREIGN PATENT DOCUMENTS

JP     2010-160790 A     7/2010

*Primary Examiner* — Christopher M Brandt
(74) *Attorney, Agent, or Firm* — Venable LLP

(57) ABSTRACT

The album creation application of the present disclosure displays image data, to which trimming is performed, and a template, which includes a slot in which the image data is arranged, so that a slot and image data to be arranged in the slot are selected by use of an input device. Position information of a point of interest in the image to be arranged in the slot is obtained. Composition patterns applicable to the image with designation of the point of interest are presented to the user, and the composition pattern to be applied, which is selected by the user from among the presented composition patterns, is obtained. Trimming is performed based on the point of interest and the selected composition pattern selected. The trimmed images are listed, so that multiple trimmed images are presented to the user as trimming proposals.

13 Claims, 24 Drawing Sheets

(56) References Cited

U.S. PATENT DOCUMENTS

| | | | |
|---|---|---|---|
| 2013/0051671 A1* | 2/2013 | Barton | G06T 7/181 |
| | | | 382/173 |
| 2014/0068499 A1* | 3/2014 | Yoo | G06F 3/0484 |
| | | | 715/781 |
| 2015/0319361 A1* | 11/2015 | Mikami | H04N 5/23219 |
| | | | 348/229.1 |
| 2018/0082437 A1* | 3/2018 | Furuhashi | H04N 5/23212 |
| 2020/0366798 A1* | 11/2020 | Ikuta | G06F 3/0488 |

* cited by examiner

| | LARGENESS OF THE AREA OF THE FACES OF PEOPLE<br>- 10 % OR MORE OF THE IMAGE AREA: 2 POINTS<br>- 5 % OR MORE AND LESS THAN 10 % OF THE IMAGE AREA: 1 POINT<br>- LESS THAN 5 % OF THE IMAGE AREA: 0 POINTS | THE NUMBER OF PEOPLE IN THE PHOTO<br>- THREE PEOPLE OR MORE: 3 POINTS<br>- TWO PEOPLE OR MORE: 2 POINTS<br>- ONE PERSON OR MORE: 1 POINT<br>- ZERO PEOPLE OR MORE: -1 POINT | PEOPLE WHO ARE CUT OUT OF THE EDGE OF THE IMAGE<br>- THE NUMBER OF PEOPLE WHO ARE CUT OUT × -2 POINTS | LOW RESOLUTION<br>- 200 TO 100 DPI: -2 POINTS<br>- LESS THAN 100 DPI: -10 POINTS | SCORE |
|---|---|---|---|---|---|
| PLAN 1 | 2 POINT(S) | 2 POINT(S) | 0 POINT(S) | 0 POINT(S) | 4 POINT(S) |
| PLAN 2 | 0 POINT(S) | 3 POINT(S) | 0 POINT(S) | 0 POINT(S) | 3 POINT(S) |
| PLAN 3 | 2 POINT(S) | 2 POINT(S) | -2 POINT(S) | 0 POINT(S) | 2 POINT(S) |
| PLAN 4 | 2 POINT(S) | 1 POINT(S) | 0 POINT(S) | -10 POINT(S) | -7 POINT(S) |

FIG.15

| RATIO OF LONGITUDINAL LENGTH TO TRANSVERSE LENGTH BETWEEN TWO POINTS OF INTEREST (LONGITUDINAL/TRANSVERSE) | CORRESPONDENCE BETWEEN POINTS OF INTEREST | POSITIONS OF POINTS OF INTEREST | POSITIONS OF INTERSECTION POINTS |
|---|---|---|---|
| 1/2 OR MORE AND LESS THAN 2/1 | THE POSITION OF THE POINT OF INTEREST ON THE LEFT SIDE IS AT AN UPPER LEVEL OR AT THE SAME LEVEL COMPARED TO THE POINT OF INTEREST ON THE RIGHT SIDE | | |
| 1/2 OR MORE AND LESS THAN 2/1 | THE POSITION OF THE POINT OF INTEREST ON THE LEFT SIDE IS AT A LOWER LEVEL COMPARED TO THE POINT OF INTEREST ON THE RIGHT SIDE | | |
| LESS THAN 1/2 | THE MIDDLE POSITION BETWEEN THE LONGITUDINAL POSITIONS OF THE POINTS OF INTEREST IS IN THE UPPER HALF AREA (INCLUDING EXACTLY AT A HALF POSITION) OF THE IMAGE | | |
| LESS THAN 1/2 | THE MIDDLE POSITION BETWEEN THE LONGITUDINAL POSITIONS OF THE POINTS OF INTEREST IS IN THE LOWER HALF AREA (NOT INCLUDING EXACTLY AT A HALF POSITION) OF THE IMAGE | | |
| 2/1 OR MORE | THE MIDDLE POSITION BETWEEN THE TRANSVERSE POSITIONS OF THE POINTS OF INTEREST IS IN THE LEFT HALF AREA (INCLUDING EXACTLY AT A HALF POSITION) OF THE IMAGE | | |
| 2/1 OR MORE | THE MIDDLE POSITION BETWEEN THE TRANSVERSE POSITIONS OF THE POINTS OF INTEREST IS IN THE RIGHT HALF AREA (NOT INCLUDING EXACTLY AT A HALF POSITION) OF THE IMAGE | | |

FIG.18

INFORMATION PROCESSING METHOD, STORAGE MEDIUM, AND INFORMATION PROCESSING APPARATUS

BACKGROUND OF THE INVENTION

Field of the Invention

The technology of the present disclosure relates to information processing technology for automatically trimming an image captured by a digital camera, or the like, into a specific composition.

Description of the Related Art

Conventionally, there has been a method in which trimming is automatically performed so that an image fits a predetermined slot and multiple results thereof are presented, so that it is possible for the user to select a desired way of trimming (see Japanese Patent Laid-Open No. 2010-160790).

However, as for the conventional trimming method in which an image is automatically made to fit a predetermined slot, there is a problem that an area as desired by the user is not necessarily trimmed since the areas to be trimmed are determined in a fixed determination method, such as "around a person", or the like.

Therefore, the technology of the present disclosure aims to generate an image trimmed in a composition desired by a user.

SUMMARY OF THE INVENTION

The technology of the present disclosure relates to an information processing method including: a first designation step for designating a position of a point of interest in an image; a determining step for determining a plurality of trimmed areas in the image, in accordance with the designated position of interest and a plurality of predetermined patterns; a display control step for controlling a display unit to display a plurality of display items indicating the plurality of determined trimmed areas; a selection step for selecting one of the displayed display items in accordance with input from a user; and an arrangement step for arranging a trimmed area, corresponding to the selected display item, in the image in a slot of an album, wherein each of the plurality of predetermined patterns indicates at least one position, in a trimmed area in the image, where the designated point of interest can be arranged, and the plurality of trimmed areas are determined such that, in each of the plurality of trimmed area, the designated position of the point of interest matches a position among the at least one position indicated by each of the plurality of predetermined patterns.

Further features of the present invention will become apparent from the following description of exemplary embodiments with reference to the attached drawings.

BRIEF DESCRIPTION OF THE DRAWINGS

FIG. 15 is a table illustrating a specific example of scoring in an embodiment;

FIG. 18 is a table for explaining processing for multiple points of interest in an embodiment;

DESCRIPTION OF THE EMBODIMENTS

Hereinafter, detailed explanations are given of preferred embodiments of the technology of the present disclosure with reference to the accompanying drawings. It should be noted that the following embodiments are not intended to limit the technology of the present disclosure according to the claims and that every combination of the characteristics explained in the present embodiments is not necessarily essential to the solution means of the technology of the present disclosure.

First Embodiment

Figure 1:
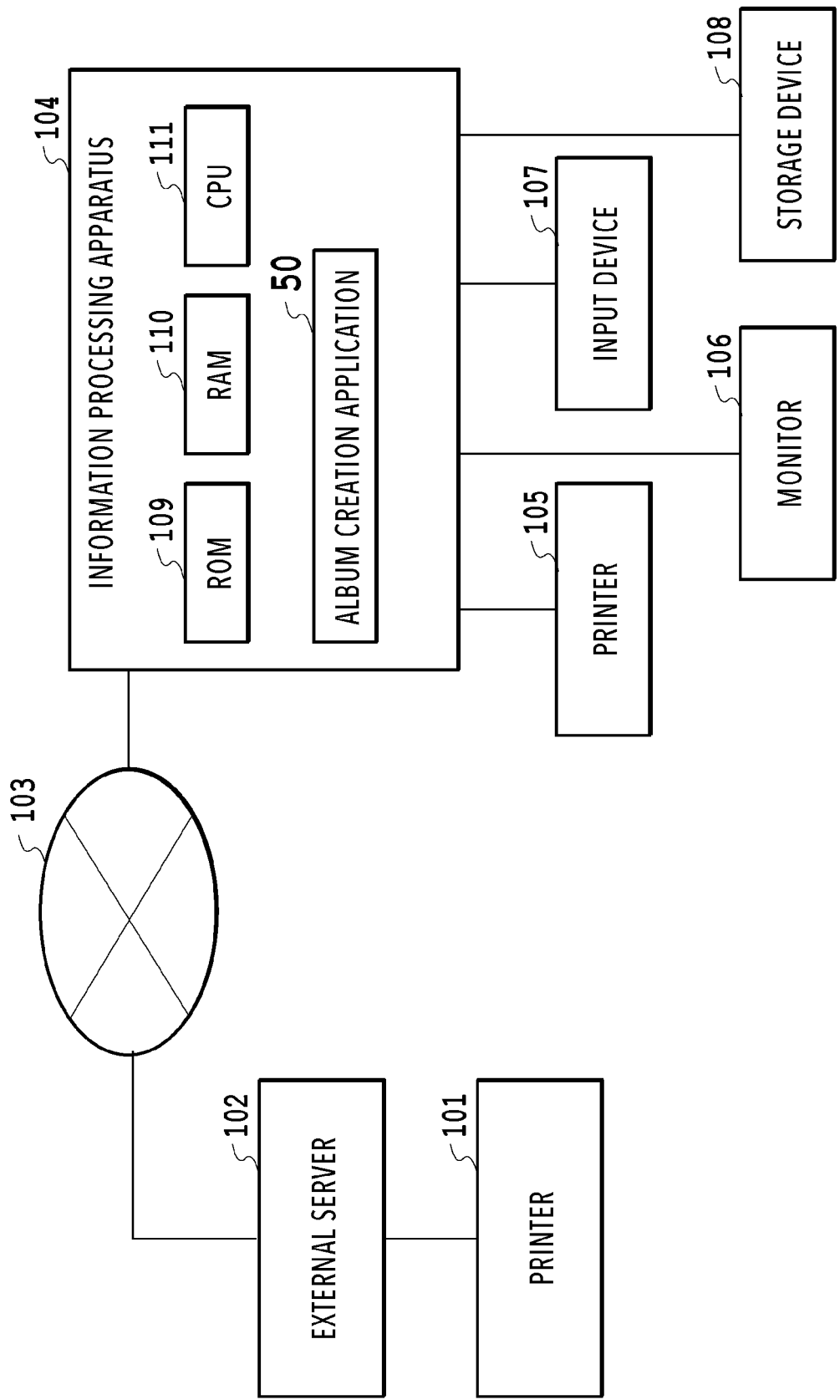
FIG. 1 is a system configuration diagram of an information processing apparatus according to an embodiment.

FIG. 1 illustrates a configuration diagram of a print system 100 according to the present embodiment. First, with reference to FIG. 1, an explanation is given of the configuration of an information processing apparatus 104 used in the technology of the present disclosure.

The information processing apparatus 104 includes a ROM 109, a RAM 110, and a CPU 111. Furthermore, the information processing apparatus 104 includes an input/output interface (not illustrated in the drawings) for connecting to a network 103 and to external devices such as a printer 105, a monitor 106, an input device 107, and a storage device 108.

The CPU 111 is a central processing unit, which entirely controls the information processing apparatus 104 by executing an operation system program (hereinafter abbreviated as an OS) stored in the storage device 108, the ROM 109, or the RAM 110. In addition, the CPU 111 executes a program stored in the ROM 109 or the RAM 110 to perform calculation based on input data, process and output data, or control each hardware, so that each function of the information processing apparatus 104 is implemented. The ROM 109 is a read-only memory in which each program is stored. The RAM 110 is a random access memory that is used as a work memory of the CPU 111. However, in a case of a non-volatile RAM, it is possible to store each program.

The information processing apparatus 104 includes an album creation application 50, which is stored in the ROM 109 or the like, and, with the album creation application 50, the information processing apparatus 104 is capable of generating album data, which corresponds to an album in which an image of image data is arranged. Furthermore, the information processing apparatus 104 is capable of outputting the generated album data to the printer 105 as print data or uploading the generated album data to an external server 102 via the network 103. Note that, in the present disclosure, an album includes a photo album and a photo book.

The network 103 is connected to the information processing apparatus 104 and the external server 102, and the network 103 is a communication network for transmitting respective information in that connection.

The external server 102 includes an input/output interface (not illustrated in the drawings) for connecting to the printer 101, and the printer 101 is connected via the input/output interface.

Album data created by the information processing apparatus 104 is uploaded to the external server 102 via the network 103. In a case where it is possible to print the uploaded album data, the external server 102 outputs the uploaded album data to the printer 101. For example, the external server 102 may be an album order/management server, so that, in a case where the user uploads album data created by the information processing apparatus 104 and performs a necessary procedure for purchasing an album, the album data is output by use of the printer 101. Thereafter, the output printed material is bound and delivered to the user.

The printer 105 is a printer for directly printing from the information processing apparatus 104. An album may be printed by the printer 105 owned by the user and connected to the information processing apparatus 104, bound by the user, and finished into the album.

The monitor 106 is a display device whose display is controlled by the information processing apparatus 104 to display image information output from the information processing apparatus 104.

The input device 107 is an input device such as a keyboard or a pointing device for the user to provide input to the information processing apparatus 104. It is also possible that the input device 107 is a device that is integrated with the monitor and is configured to provide input based on direct touching of the monitor.

The storage device 108 is a storage device such as an HDD or SSD that stores image data, a template having an image arrangement frame (slot) for arranging an image, etc.

Note that, in the block diagram illustrated in FIG. 1, the information processing apparatus 104 is described as a component separate from the monitor 106, the input device 107, and the storage device 108. However, as for the information processing apparatus 104, it is also possible that the monitor 106, the input device 107, and the storage device 108 (which may be shared with the RAM of the information processing apparatus) are integrated with the information processing apparatus 104 as components of the information processing apparatus 104.

Figure 2:
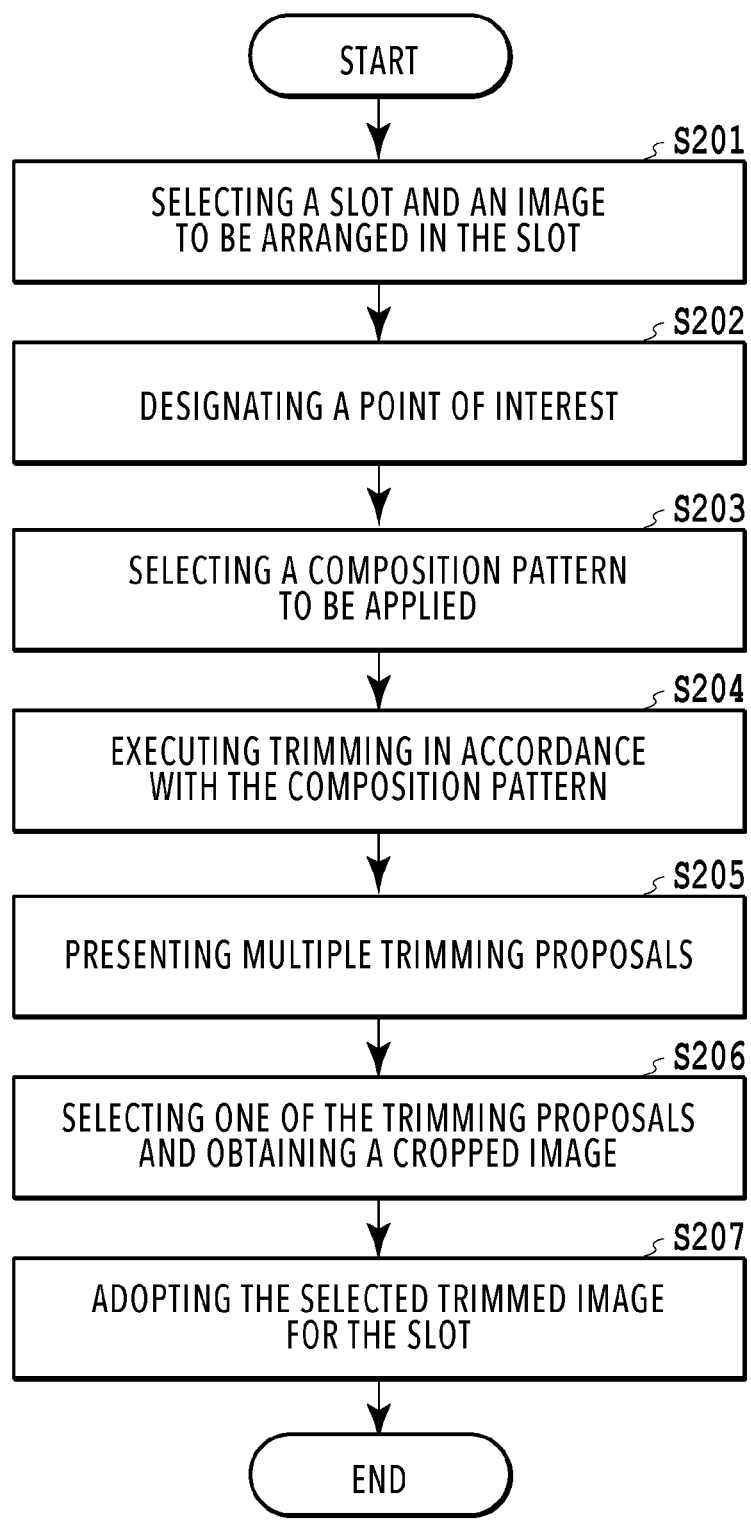
FIG. 2 is a flowchart for explaining processing for a rule-of-thirds composition in an embodiment.

Next, in FIG. 2, a flowchart of processing for presenting trimming proposals in the present embodiment is illustrated.

In S201, the album creation application 50 displays image data, to which trimming is performed, and a template, which includes a slot in which the image data is arranged, in a selectable manner for the user. Then, in the album creation application 50, the user selects a slot and image data to be arranged in the slot by use of the input device 107.

In S202, the album creation application 50 obtains the position information of a point of interest in the image to be arranged in the slot. A point of interest is a point indicating the center of the main target in trimming, and a point of interest is used to designate the center of the face of the person who is to be the main target, the center of the object that is to be the main target, or the like.

Figure 3:
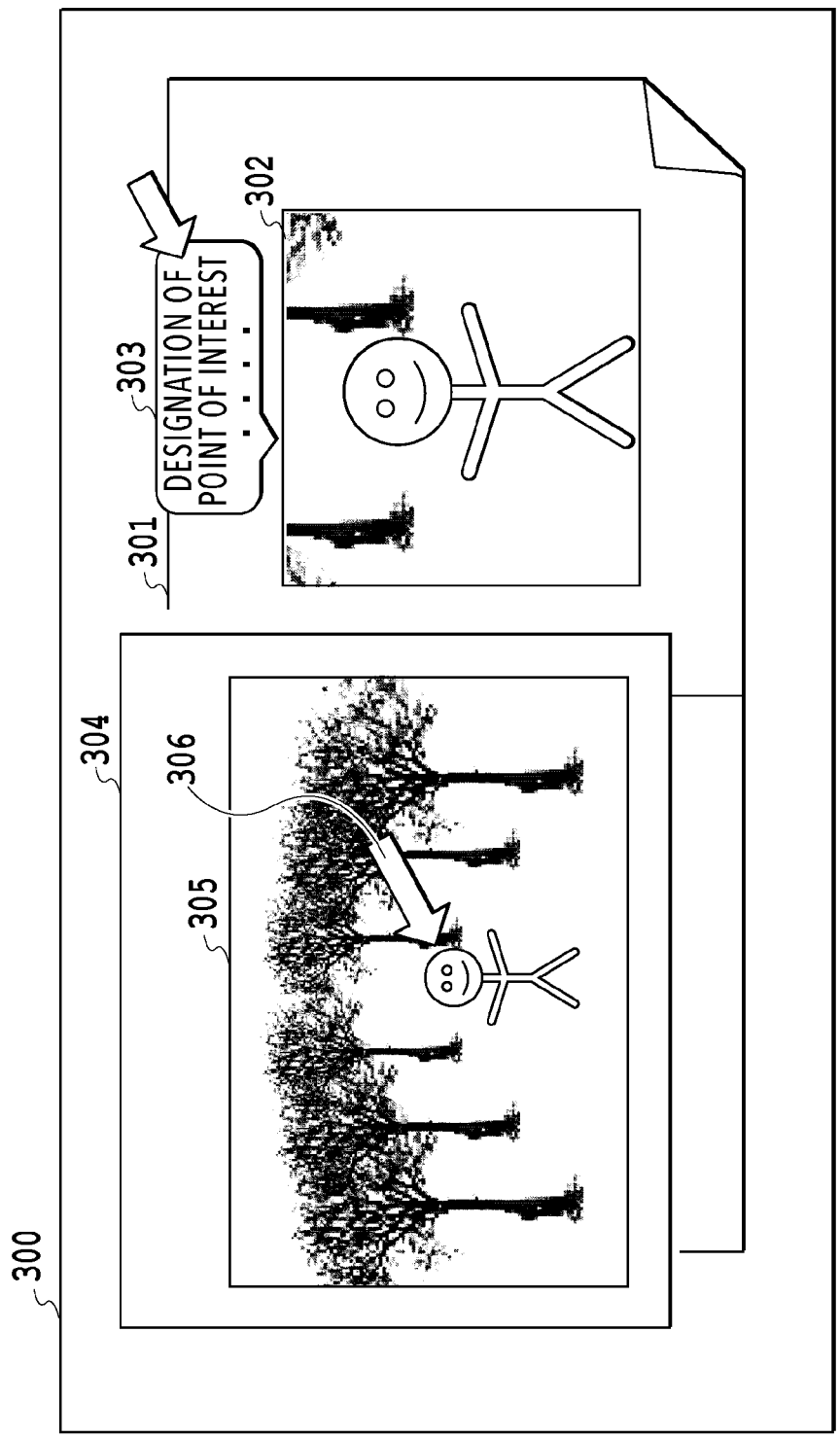
FIG. 3 is a UI diagram illustrating a specific example of designating a point of interest in an embodiment.

FIG. 3 is an example of a UI screen for allowing the user to designate a point of interest in the present embodiment. Reference numeral 300 denotes a screen for editing an album, and reference numeral 301 denotes a template of the album. Reference numeral 302 denotes a slot of the template 301, and FIG. 3 illustrates a situation in which an image automatically trimmed down to the entire body of a person according to the shape of the slot 302 is arranged. It is possible for the user to designate a point of interest for the image to be arranged in the slot 302, so that the image to be arranged in the slot 302 is trimmed to a good appearance.

For allowing the user to designate a point of interest, in a case where the user provides an instruction for designating a point of interest by use of a pointer, or the like, on the menu 303 where the user can provide an operation on a per slot basis, a point of interest settings screen 304 for setting a point of interest in accordance with the instruction for designating a point of interest will open. On the point of interest settings screen 304, the entire image of the image trimmed and arranged in the slot 302 is displayed. The user designates a point of interest for the displayed image by use of the pointer 305. For example, in a case where the center of the face of the person to be the main target in trimming is designated by the user by use of the pointer, the center of the face of the person is set as the point of interest. Furthermore, instead of designation by the user, it is also possible to use a face recognition engine to automatically set a point of interest. For example, it is possible that, in a case where only one face is detected, the center of that face is set as the point of interest, and, in a case where multiple faces are detected, the center of a face designated by the user from among the multiple faces is set as the point of interest.

Figure 4:
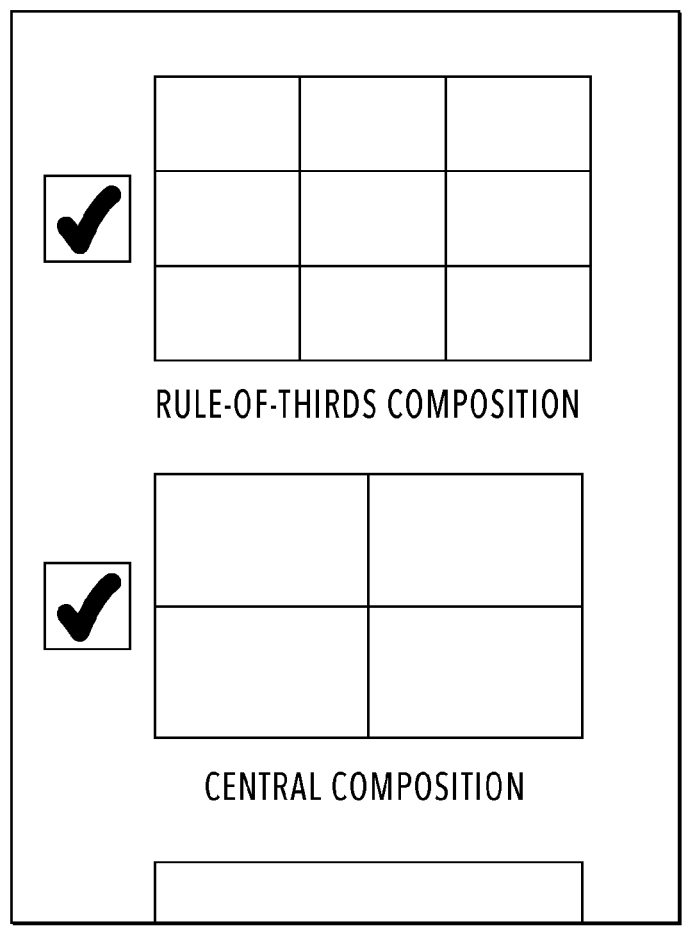
FIG. 4 is a UI diagram illustrating a specific example of selecting a composition pattern in an embodiment.

In S203, the album creation application 50 presents composition patterns applicable to the image with designation of the point of interest to the user in a selectable manner, and the album creation application 50 obtains the composition pattern to be applied, which is selected by the user from among the presented composition patterns. FIG. 4 is an example of a UI screen that presents composition patterns to the user, where a situation in which a rule-of-thirds composition and a central composition are selected is illustrated. The composition pattern used for trimming may be selected by the user or may be automatically selected from among predetermined multiple composition patters. For example, it is possible to use a method of selecting a predetermined composition pattern or a method of analyzing the position of the point of interest and automatically selecting a composition pattern that can be easily applied. Note that, in the present disclosure, a composition pattern defines the relative positional relationship between the position of a point of interest and the outer peripheral edge of an area to be trimmed.

In S204, the album creation application 50 performs trimming based on the point of interest designated in S202 and the composition pattern selected in S203. In S204, trimming processing is executed in multiple ways that can be adopted, based on the point of interest designated in S202 and the composition pattern selected in S203. For example, as described later, in a case of a rule-of-thirds composition, there can be multiple patterns for arranging the point of interest. In S204, trimming is executed in each of the multiple ways. Here, an explanation is given of a specific example of trimming using a rule-of-thirds composition. The rule-of-thirds composition is applied by overlapping a target (person/object) to be the main part with intersection points of two auxiliary lines that divide the screen longitudinally into three parts and two auxiliary lines that divide the screen transversally into three parts. In the present disclosure, the rule-of-thirds composition is applied by overlapping the point of interest of the main target with any one of the four intersection points.

Figure 5:
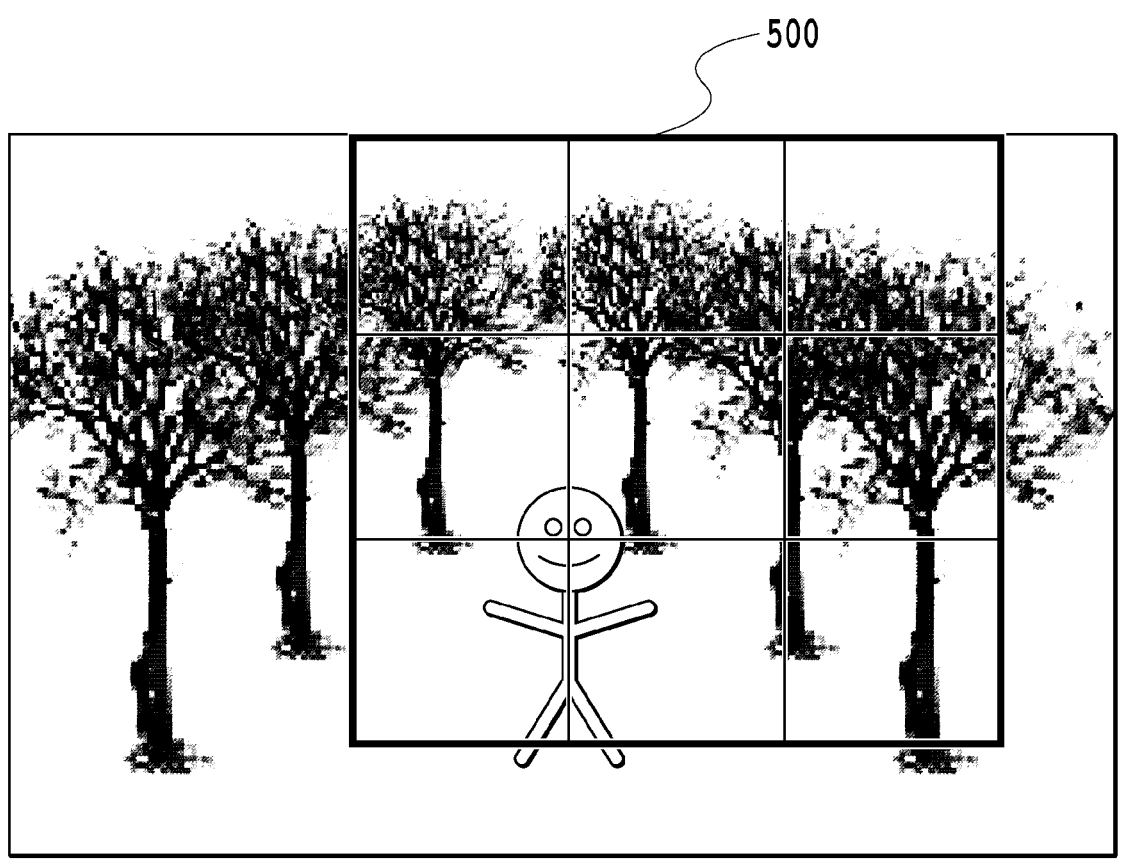
FIG. 5 is an explanatory diagram illustrating a specific example to which a rule-of-thirds composition is applied in an embodiment.

FIG. 5 illustrates a situation in which the point of interest is at the center of the face of the person and the point of interest is overlapped with the lower left intersection point of the four intersection points in the rule-of-thirds composition. Reference numeral 500 denotes an outer frame representing the area to be trimmed (hereinafter referred to as the trimming area), which has the same aspect ratio as the slot 302 of FIG. 3 and has the largest possible area.

Figure 6:
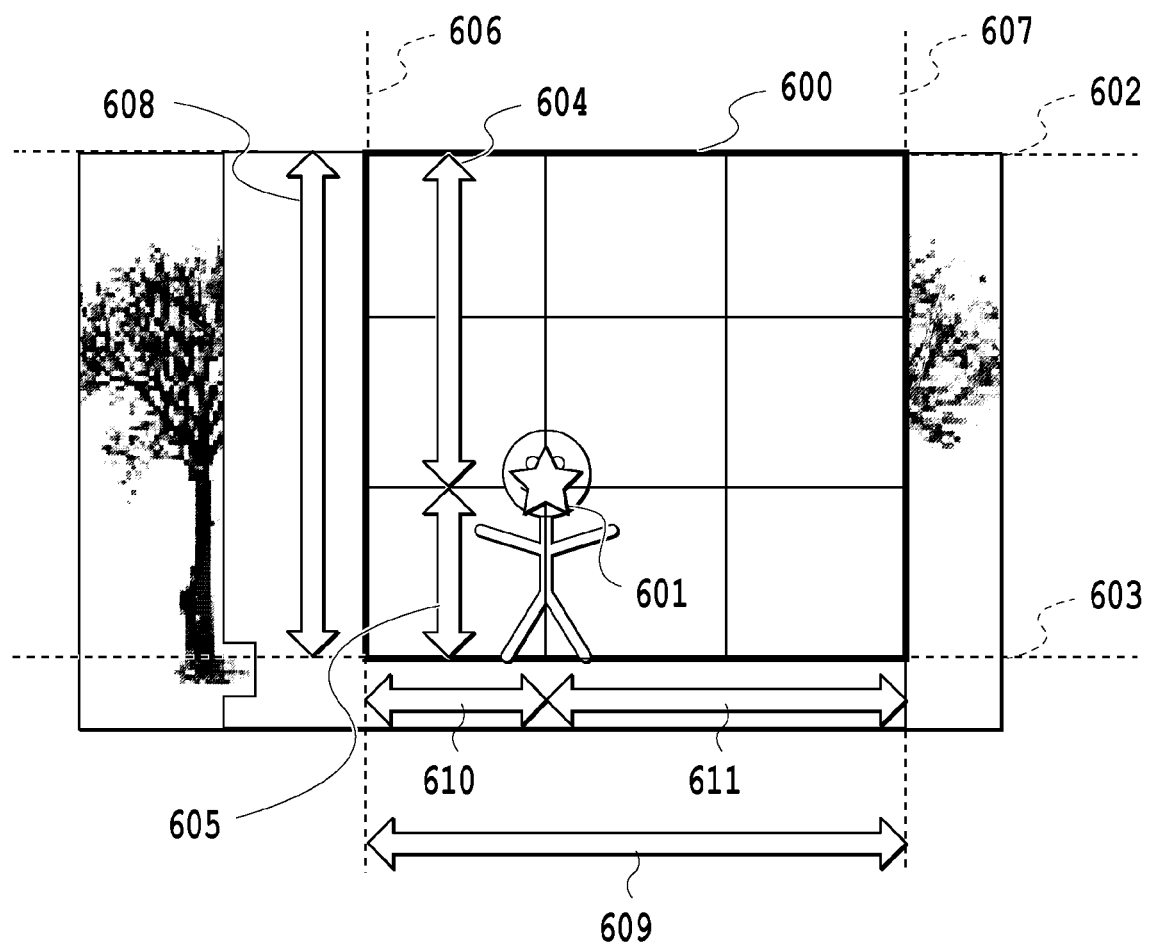
FIG. 6 is an explanatory diagram of a method of applying a rule-of-thirds composition in an embodiment.
Figure 7:
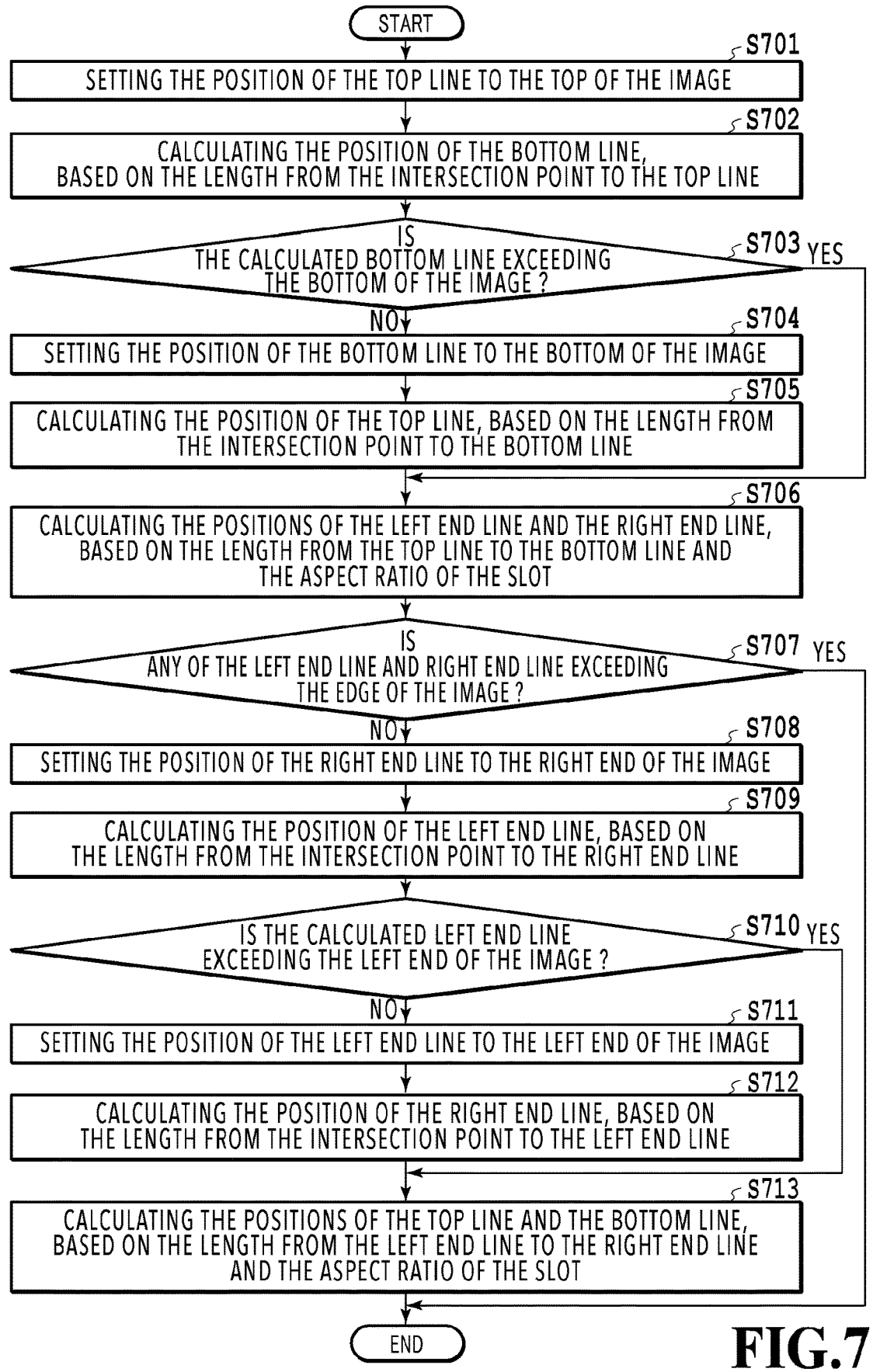
FIG. 7 is a flowchart for explaining a method of applying a rule-of-thirds composition in an embodiment.

FIG. 6 is a diagram for explaining a specific example of calculating the position of the trimming area 600. Furthermore, FIG. 7 is a flowchart of processing for obtaining the positions of the top line, the bottom line, the left end line, and the right end line of the trimming area.

Reference numeral 601 in FIG. 6 denotes the intersection point corresponding to the position of the point of interest, which is positioned at the lower left intersection point (hereinafter simply referred to as the intersection point) of the four intersection points in the rule-of-thirds composition.

First, in S701, the album creation application 50 obtains the position of the top line 602 of the trimming area 600 with reference to the position of the intersection point overlapping with the point of interest (or the point of interest overlapping the intersection point). In order to maximize the area of the trimming area 600, the position of the top line 602 is set to the top of the image. Details of the method for maximizing the trimming area will be described later with reference to FIG. 9.

In S702, the album creation application 50 obtains the position of the bottom line 603 so that the length 605 from the intersection point 601 to the bottom line 603 is half the length of the length 604 from the intersection point 601 to the top line 602. This is because the intersection point 601 is the lower left one of the four intersection points in the rule-of-thirds composition.

Here, in S703, the album creation application 50 determines whether the position of the bottom line 603 is exceeding the bottom of the image. In a case where the position of the bottom line 603 is exceeding the bottom of the image, the processing proceeds to S704, and, in a case where the position of the bottom line 603 is not exceeding the bottom of the image, the processing proceeds to S706.

In S704, the album creation application 50 sets the position of the bottom line 603 to the bottom of the image.

In S705, the album creation application 50 sets the position of the top line 602 so that the length 604 from the intersection point to the top line 602 is double the length of the length 605 from the intersection point to the bottom line 603.

Next, in S706, the album creation application 50 obtains the positions of the left end line 606 and the right end line 607 of the trimming area 600. The length 609 from the left end line 606 to the right end line 607 is obtained from the length 608 from the top line 602 to the bottom line 603 and the aspect ratio of the slot. For example, in a case where the length 608 (corresponding to the longitudinal length) is 1000 pixels and the aspect ratio of the slot is 1:2 (longitudinal to transverse), the length 609 (corresponding to the transversal length) can be calculated as 2000 (=1000×2±1).

Note that, in the example of FIG. 6, the aspect ratio of the slot is 1:1 and the intersection point overlapped with the point of interest is the lower left one of the four intersection points in the rule-of-thirds composition, and, therefore, the one third of the calculated length 609 is the length 610 from the intersection point to the left end line 606. Similarly, the two third of the length 609 is the length 611 from the intersection point to the right end line 607. In this way, the positions of the left end line 606 and the right end line 607 are set, respectively.

Next, in S707, the album creation application 50 determines whether any of the positions of the left end line 606 and the right end line 607 is exceeding the edge of the image. In a case where any of the positions of the left end line 606 and the right end line 607 is exceeding the edge of the image, the processing proceeds to S708, and, in a case where none of the positions of the left end line 606 and the right end line 607 is exceeding the edge of the image, the present flow ends.

In a case where any of the positions of the left end line 606 and the right end line 607 is exceeding the edge of the image, the album creation application 50 deletes the previously obtained positions of the top line 602 and the bottom line 603 and sets the position of the right end line 607 to the right end of the image in S708.

Since the intersection point is the lower left one of the four intersection points, in S709, the album creation application 50 sets the position of the right end line 607 to the position of the right end of the image. Then, the position of the left end line 606 is obtained so that half the length of the length from the intersection point 601 to the right end line 607 is the length from the intersection point 601 to the left end line 606.

In S710, the album creation application 50 determines whether the position of the left end line 606 obtained in S709 is exceeding the edge of the image. In a case where the position of the left end line 606 is exceeding the edge of the image, the processing proceeds to S711, and, in a case where the position of the left end line 606 is not exceeding the left end of the image, the processing proceeds to S713.

In a case where the position of the left end line 606 is exceeding the edge of the image, in S711, the album creation application 50 sets the position of the left end line 606 to the left end of the image.

In S712, the album creation application 50 obtains the position of the right end line 607 so that the length from the intersection point 601 to the right end line 607 is double the length of the length from the intersection point 601 to the left end line 606.

In S713, the album creation application 50 obtains the positions of the top line 602 and the bottom line 603, based on the position of the left end line 606 or the right end line 607 and the aspect ratio of the slot.

As described above, according to the processing illustrated in FIG. 7, in a case where a point of interest of an image is arranged at any one of intersection points specified by a composition pattern, it is possible to perform trimming so that the trimming area has the maximum area.

The position (coordinates, or the like) of the trimming area 600 is obtained, based on the positions of the top line 602, the bottom line 603, the left end line 606, and the right end line 607 obtained above. Note that, in the above-described flow, the order of determining the positions of the top line 602 and the bottom line 603 can be switched, and the order of determining the positions of the left end line 606 and the right end line 607 can be switched as well.

Figure 8A:
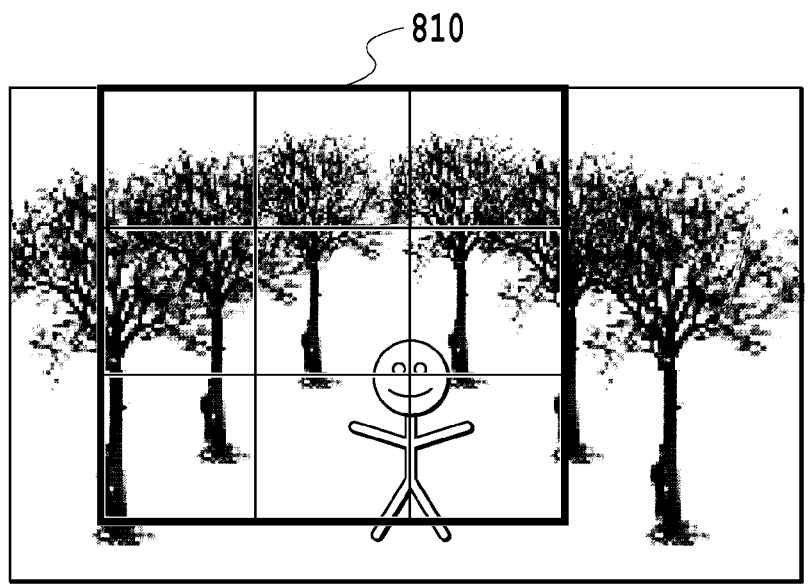
FIG. 8A is an explanatory diagram illustrating a specific example to which a rule-of-thirds composition is applied in an embodiment.
Figure 8B:
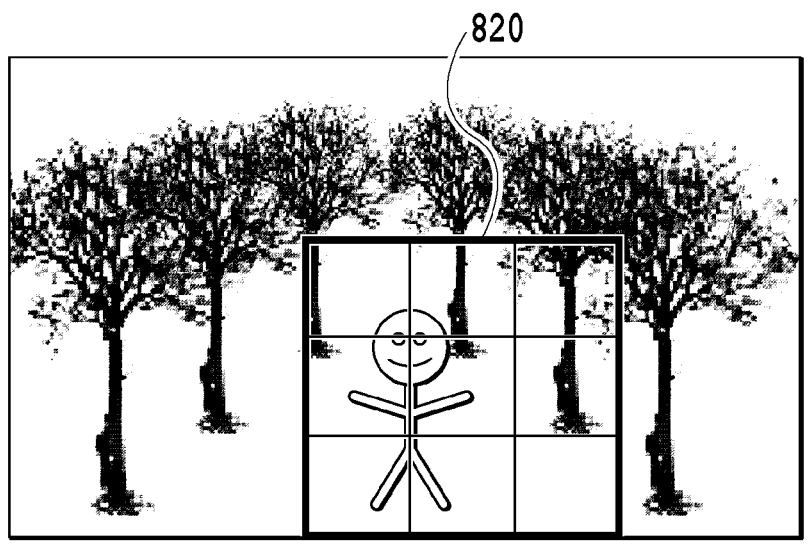
FIG. 8B is an explanatory diagram illustrating a specific example to which a rule-of-thirds composition is applied in an embodiment.
Figure 8C:
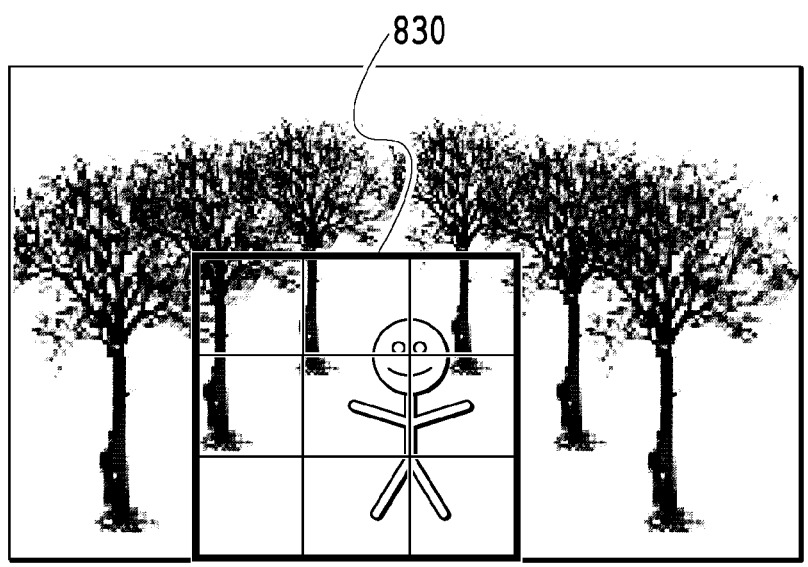
FIG. 8C is an explanatory diagram illustrating a specific example to which a rule-of-thirds composition is applied in an embodiment.

FIG. 8A through FIG. 8C are diagrams illustrating situations in which the point of interest is at the center of the face of the person and the point of interest is overlapped with the lower right, upper left, or upper right intersection points of the four intersection points in the rule-of-thirds composition, respectively.

FIG. 8A is a diagram illustrating a situation in which the point of interest is at the center of the face of the person and the point of interest is overlapped with the lower right intersection point of the four intersection points in the rule-of-thirds composition. Reference numeral 810 denotes the outer frame of the area to be trimmed, and the outer frame 810 has the largest possible area with the same aspect ratio as the slot. The position of the outer frame 810 can be obtained by the same algorithm as the above-described specific example with reference to FIG. 6 by partially changing the ratio of the lengths. Specifically, it is possible to change S709 such that the position of the left end line 606 is obtained so that double the length of the length 611 from the intersection point 601 to the right end line 607 is the length 610 from the intersection point 601 to the left end line 606. Furthermore, it is possible to change S712 such that the position of the right end line 607 is obtained so that the length 611 from the intersection point 601 to the right end line 607 is half the length of the length 610 from the intersection point 601 to the left end line 606.

FIG. 8B is a diagram illustrating a situation in which the point of interest is at the center of the face of the person and the point of interest is overlapped with the upper left intersection point of the four intersection points in the rule-of-thirds composition. Reference numeral 820 denotes the outer frame of the area to be trimmed, and the outer frame 820 has the largest possible area with the same aspect ratio as the slot. The position of the outer frame 820 can be obtained by the same algorithm as the above-described specific example with reference to FIG. 6 by partially changing the ratio of the lengths. Specifically, it is possible to change S702 such that the position of the bottom line 603 is obtained so that double the length of the length 604 from the intersection point 601 to the top line 602 is the length 605 from the intersection point 601 to the bottom line 603. Furthermore, it is possible to change S705 such that the position of the top line 602 is obtained so that the length 604 from the intersection point 601 to the top line 602 is half the length of the length 605 from the intersection point 601 to the bottom line 603.

FIG. 8C is a diagram illustrating a situation in which the point of interest is at the center of the face of the person and the point of interest is overlapped with the upper right intersection point of the four intersection points in the rule-of-thirds composition. Reference numeral 830 denotes the outer frame of the area to be trimmed, and the outer frame 830 has the largest possible area with the same aspect ratio as the slot. The position of the outer frame 830 can be obtained by the same algorithm as the above-described specific example with reference to FIG. 6 by partially changing the ratio of the lengths. Specifically, it is possible to change S702 such that the position of the bottom line 603 is obtained so that double the length of the length 604 from the intersection point 601 to the top line 602 is the length 605 from the intersection point 601 to the bottom line 603. Furthermore, it is possible to change S705 such that the position of the top line 602 is obtained so that the length 604 from the intersection point 601 to the top line 602 is half the length of the length 605 from the intersection point 601 to the bottom line 603. Moreover, it is possible to change S709 such that the position of the left end line 606 is obtained so that double the length of the length 611 from the intersection point 601 to the right end line 607 is the length 610 from the intersection point 601 to the left end line 606. Furthermore, it is possible to change S712 such that the position of the right end line 607 is obtained so that the length 611 from the intersection point 601 to the right end line 607 is half the length of the length 610 from the intersection point 601 to the left end line 606.

Figure 9:
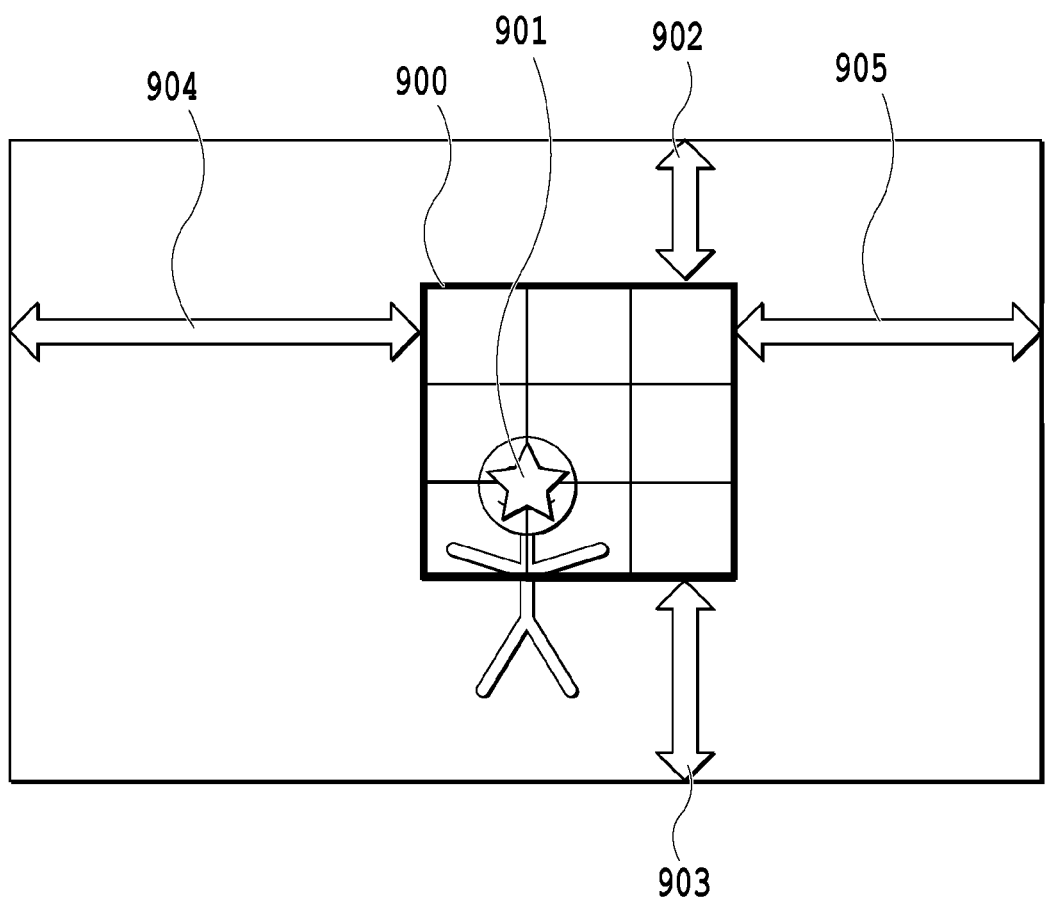
FIG. 9 is an explanatory diagram of a method of applying a rule-of-thirds composition in an embodiment.

FIG. 9 is a diagram for explaining another specific example of calculating the position of the outer frame to which a rule-of-thirds composition is applied. Reference numeral 901 denotes the intersection point corresponding to the position of the point of interest, which is positioned at the lower left intersection point (hereinafter referred to as the intersection point) of the four intersection points in the rule-of-thirds composition. Note that, in the following explanation, the position of the intersection point is not limited as such since the present algorithm can be similarly processed in a case of any of the four intersection points. First, the area 900 to which tentative trimming is performed (hereinafter referred to as the tentative trimming area 900) is determined. The tentative trimming area 900 has a size that definitely fits inside the image area. For example, the length from the intersection point 901 to the top of the tentative trimming area 900 is set to one tenth of the longitudinal length of the image, so that the position of the top is defined to be included in the size of the image. Then, the other positions, that is, the positions of the bottom of the tentative trimming area 900, the left end of the tentative trimming area 900, and the right end of the tentative trimming area 900 are sequentially obtained, based on the position of the intersection point and the aspect ratio of the slot.

After the tentative trimming area 900 is defined, the length 902 from the top of the tentative trimming area 900 to the top of the image and the length 903 from the bottom of the tentative trimming area 900 to the bottom of the image are obtained. Furthermore, the length 904 from the left end of the tentative trimming area 900 to the left end of the image and the length 905 from the right end of the tentative trimming area 900 to the right end of the image are obtained. Then, in a case where the ratio of the respective lengths from the intersection point 901 to the top, the bottom, the left end, and the right end of the tentative trimming area 900 is, for example, 2:1:1:2, the shortest length among the length 902, half the length of the length 903, half the length of the length 904, and the length 905 is obtained. Then, the tentative trimming area 900 is scaled such that the sides corresponding to the respective lengths move in accordance with the shortest length. That is, the side to be the reference for scaling is determined, so that each of the sides does not protrude from the image due to the scaling. In the following explanation, it is assumed that the shortest length in the present example is the length 902 and the side to be the reference for scaling is the upper side.

The position of the top of the tentative trimming area 900 is moved upward by the length 902, and the position of the bottom of the tentative trimming area 900 is moved downward by half the length of the length 902 since the intersection point overlapped with the point of interest is the lower left one of the four intersection points in the rule-of-thirds composition. Here, the top of the tentative trimming area 900 is at the same position as the top of the image, and the bottom of the tentative trimming area 900 is inside the image area.

Next, the lengths of moving the left end and the right end of the tentative trimming area 900 are calculated, based on the length 902 and the aspect ratio of the slot. Since the length 902 in the present example is a length for the longitudinal direction, lengths for the transverse direction are calculated, based on the aspect ratio of the slot. For example, in a case where the length 902 is 100 pixels and the aspect ratio of the slot is 1:1 (longitudinal to transverse), the length for extension in the longitudinal direction is 150 pixels, and the length for extension in the transverse direction is 150 pixels as well. Since the intersection point overlapped with the point of interest is the lower left one of the four intersection points in the rule-of-thirds composition, the position of the left end of the tentative trimming area 900 is moved leftward by one third of the obtained length for extension in the transverse direction (here, 150 pixels). Similarly, the position of the right end of the tentative trimming area 900 is moved rightward by two thirds of the obtained length for extension in the transverse direction (150). Here, the right end and left end of the tentative trimming area 900 are definitely inside the image area. Based on the positions of the top, the bottom, the left end, and the right end obtained above, the position (coordinates, or the like) of the trimming area can be obtained.

Next, an explanation is given of a specific example of trimming using a central composition. The central composition is applied by overlapping a target (person/object) to be the main part with the center point of the screen. Since the target to be the main part is designated as the point of interest in the present disclosure, the central composition is applied by overlapping the point of interest with the center point of the screen.

Figure 10:
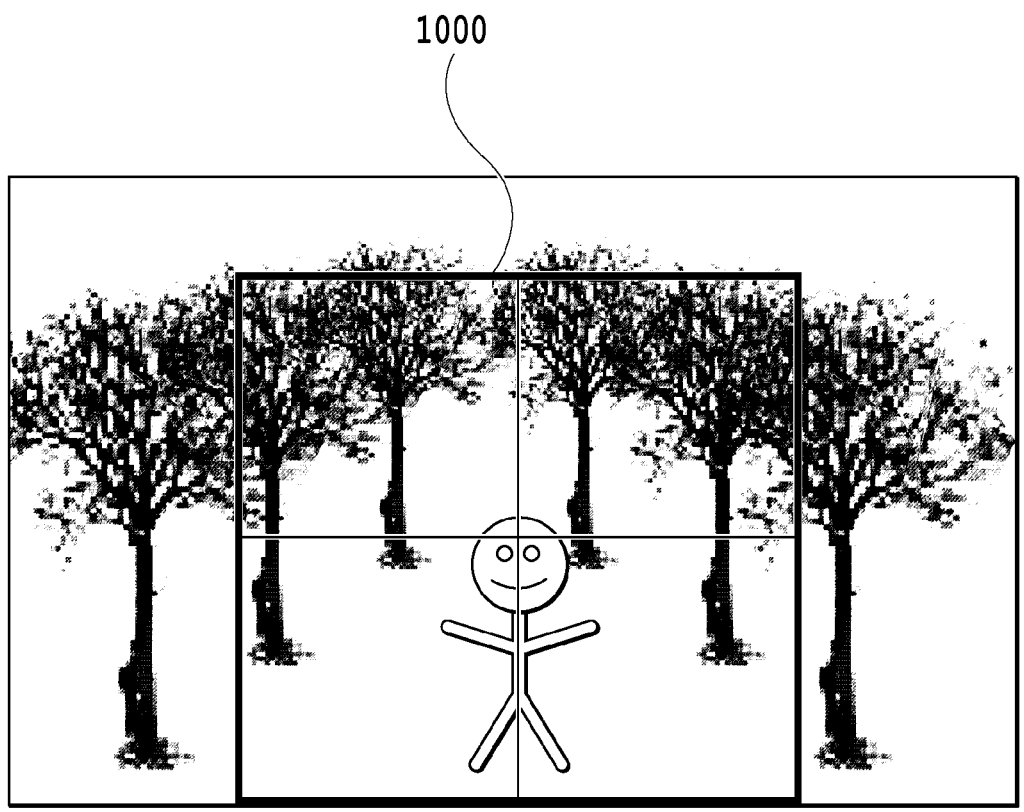
FIG. 10 is an explanatory diagram illustrating a specific example to which a central composition is applied in an embodiment.

FIG. 10 illustrates a situation in which the point of interest is at the center of the face of the person and the point of interest is overlapped with the center point of the area to be trimmed. Reference numeral 1000 denotes the outer frame of the area to be trimmed (hereinafter referred to as the trimming area). The trimming area 1000 has the same aspect ratio as the slot and has the largest possible area.

Figure 11:
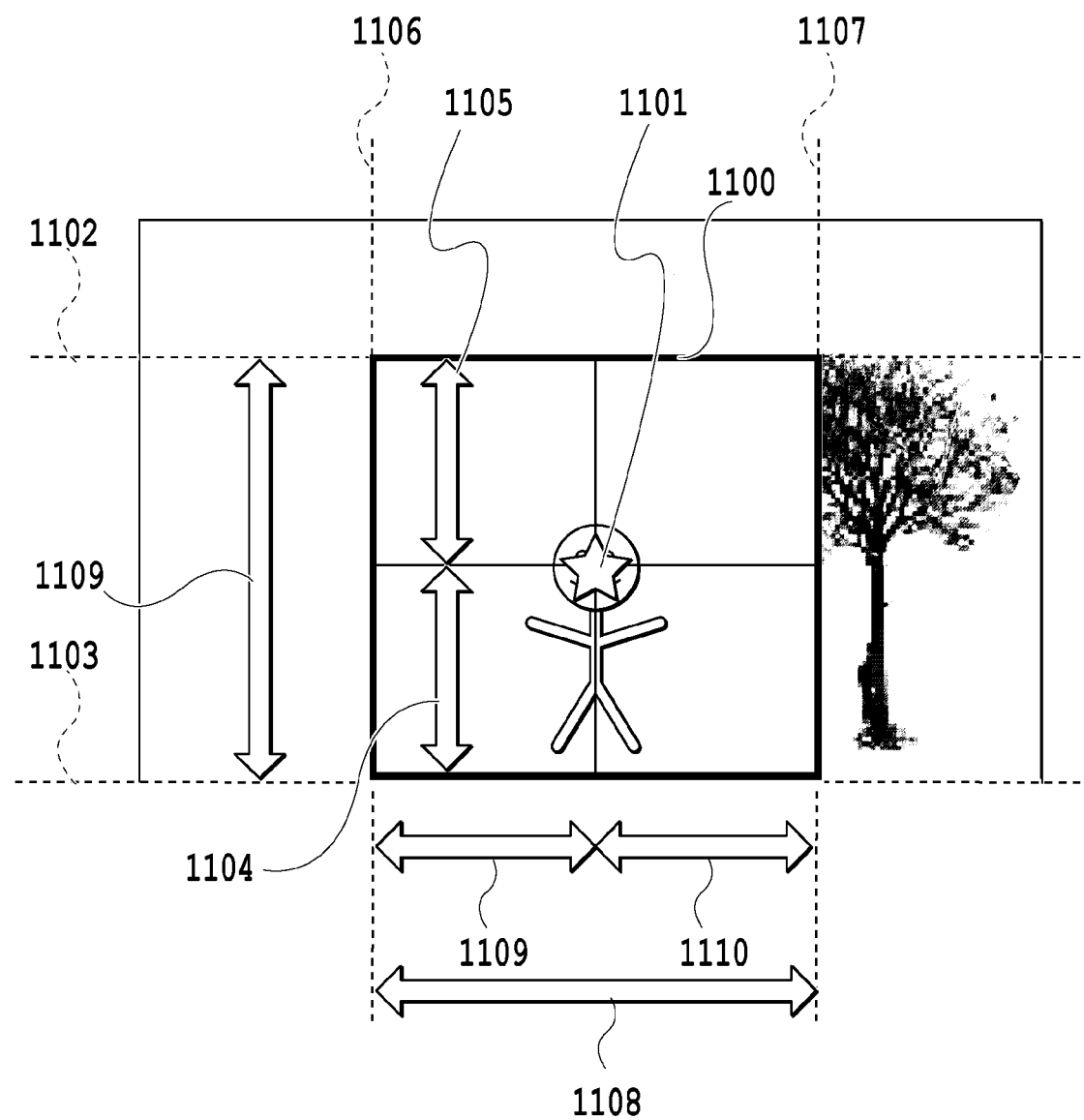
FIG. 11 is an explanatory diagram of a method of applying a central composition in an embodiment.
Figure 12:
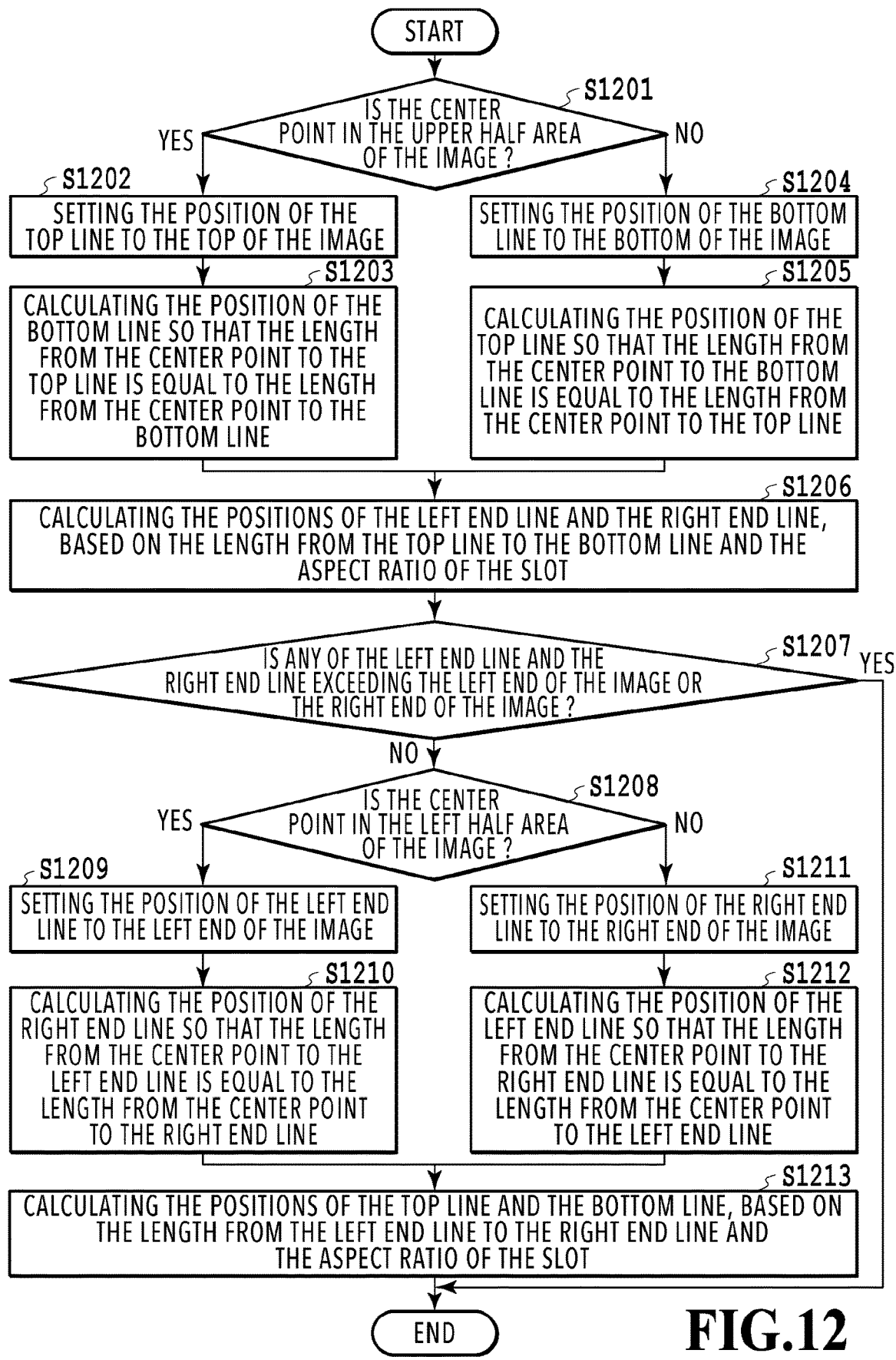
FIG. 12 is a flowchart for explaining a method of applying a central composition in an embodiment.

FIG. 11 is a diagram for explaining a specific example of calculating the position of the outer frame in the central composition. FIG. 12 is a flowchart of processing for obtaining the positions of the top line, the bottom line, the left end line, and the right end line to be described with reference to FIG. 11. Reference numeral 1101 denotes the position of the point of interest, and, since the central composition is applied, the position of the center point of the trimming area 1100 (hereinafter referred to as the center point) is overlapped with the point of interest 1101.

First, the positions of the top line 1102 of the trimming area 1100 and the bottom line 1103 of the trimming area 1100 are obtained with reference to the position of the center point overlapped with the point of interest 1101.

In S1201, the album creation application 50 determines whether the center point of the trimming area 1100 overlapped the point of interest 1101 is positioned in the upper half area of the image or not. In a case where the center point is positioned in the upper half area, the processing proceeds to S1202, and, in a case where the center point is not positioned in the upper half area, the processing proceeds to S1204.

In a case where the center point is positioned in the upper half area of the image, the album creation application 50 sets the position of the top line 1102 to the top of the image in S1202.

In S1203, the album creation application 50 obtains the position of the bottom line 1103 so that the length 1104 from the center point to the bottom line 1103 is equal to the length 1105 from the center point to the top line 1102.

In the case where the center point is positioned in the lower half area of the image, the album creation application 50 sets the position of the bottom line 1103 to the bottom of the image in S1204.

In S1205, the album creation application 50 obtains the position of the top line 1102 so that the length 1105 from the center point to the top line 1102 is equal to the length 1104 from the center point to the bottom line 1103.

Next, the left end line 1106 of the trimming area 1100 and the right end line 1107 of the trimming area 1100 are obtained.

In S1206, the album creation application 50 obtains the positions of the left end line 1106 and the right end line 1107 of the trimming area 1100. The length 1108 from the left end line 1106 to the right end line 1107 is obtained from the length 1109 from the top line 1102 to the bottom line 1103 and the aspect ratio of the slot. For example, in a case where the length 1109 (corresponding to the longitudinal length) is 1000 pixels and the aspect ratio of the slot is 1:2 (longitudinal to transverse), the length 1108 (corresponding to the transverse length) can be calculated as 2000 (=1000×2±1).

Note that, since the aspect ratio of the slot is 1:1 and the center point corresponds to the center of the trimming area 1100 in the example of FIG. 11, half the length of the calculated length 1108 is the length 1109 from the center point to the left end line 1106 and the length 1110 from the center point to the right end line 1107. Therefore, the position of the left end line 1106 and the position of the right end line 1107 can be obtained. In this way, the positions of the left end line 1106 and the right end line 1107 are set, respectively.

Next, in S1207, the album creation application 50 determines whether any of the positions of the left end line 1106 and the right end line 1107 is exceeding the edge of the image. In a case where any of the positions of the left end line 1106 and the right end line 1107 is exceeding the edge of the image, the processing proceeds to S1208, and, in a case where none of the positions of the left end line 1106 and the right end line 1107 is exceeding the edge of the image, the present flow ends.

In the case where any of the positions of the left end line 1106 and the right end line 1107 is exceeding the edge of the image, in S1208, the album creation application 50 determines whether the center point is positioned in the left half area of the image or not. In a case where the center point is positioned in the left half area, the processing proceeds to S1209, and, in a case where the center point is not positioned in the left half area, the processing proceeds to S1211.

In a case where the center point is positioned in the left half area, in S1209, the album creation application 50 deletes the previously obtained positions of the top line 1102 and the bottom line 1103 and sets the position of the left end line 1106 to the left end of the image.

In S1210, the album creation application 50 obtains the position of the right end line 1107 so that the length 1110 from the center point, at which the point of interest 1101 is positioned, to the right end line 1107 is equal to the length 1109 from the center point to the left end line 1106.

In a case where the center point is not positioned in the left half area, the album creation application 50 deletes the previously obtained positions of the top line 1102 and the bottom line 1103 and sets the position of the right end line 1107 to the right end of the image in S1211.

In S1212, the album creation application 50 obtains the position of the left end line 1106 so that the length 1109 from the center point, at which the point of interest 1101 is positioned, to the left end line 1106 is equal to the length 1110 from the center point to the right end line 1107.

In S1213, the album creation application 50 obtains the positions of the top line 1102 and the bottom line 1103, based on the position of the left end line 1106 or the right end line 1107 and the aspect ratio of the slot.

The position (coordinates, or the like) of the trimming area is obtained, based on the positions of the top line 1102, the bottom line 1103, the left end line 1106, and the right end line 1107 obtained above. Note that, needless to say, in the above-described flow, the order of determining the positions of the top line 1102 and the bottom line 1103 can be switched, and the order of determining the positions of the left end line 1106 and the right end line 1107 can be switched as well.

Figure 13:
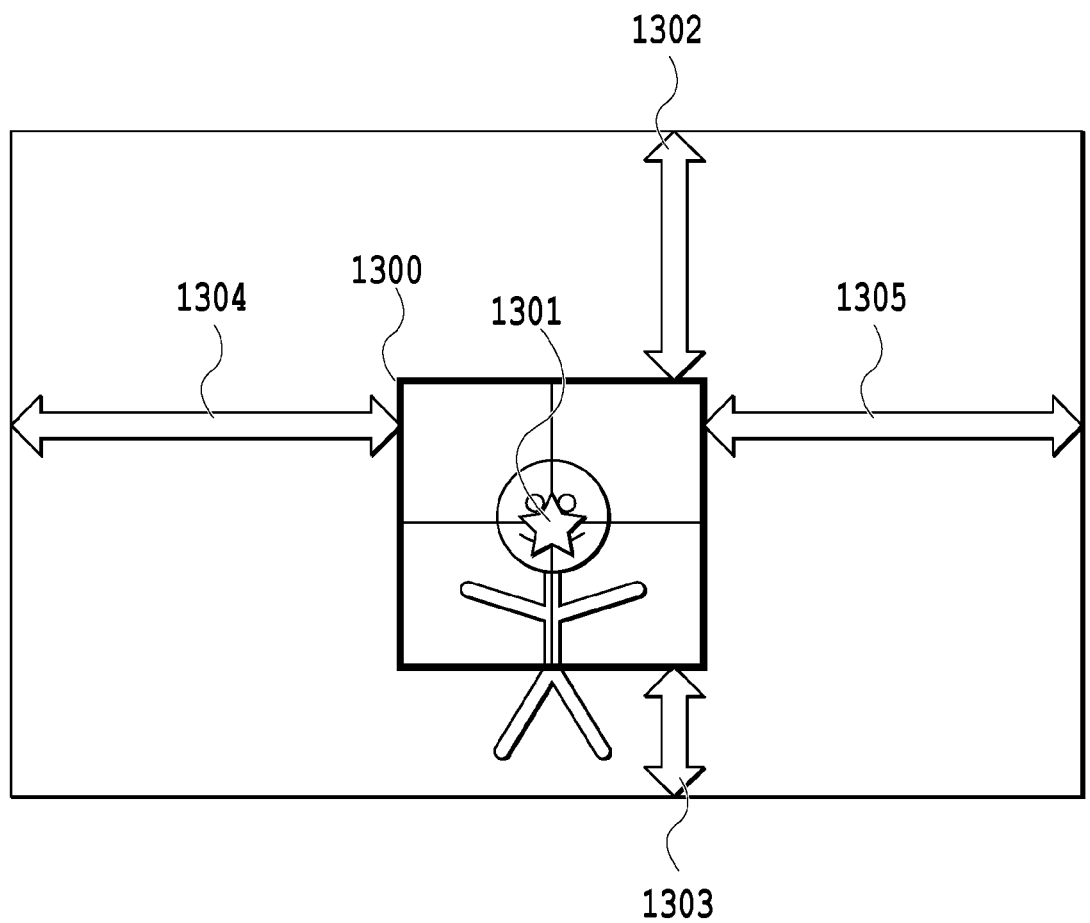
FIG. 13 is an explanatory diagram of a method of applying a central composition in an embodiment.

FIG. 13 is a diagram for explaining another specific example of calculating the position of the outer frame in the central composition. Reference numeral 1800 denotes the position of the point of interest, at which the center point 1301 of the central composition (hereinafter referred to as the center point 1301) is positioned. First, the area 1300 to which tentative trimming is performed (hereinafter referred to as the tentative trimming area 1300) is determined. The tentative trimming area 1300 has a size that definitely fits inside the image area. For example, the length from the center point 1301 to the top of the tentative trimming area 1300 is set to one tenth of the longitudinal length of the image, so that the position of the top is defined to be included in the size of the image. Then, the other positions, that is, the positions of the bottom of the tentative trimming area 1300, the left end of the tentative trimming area 1300, and the right end of the tentative trimming area 1300 are sequentially obtained, based on the position of the intersection point and the aspect ratio of the slot.

After the tentative trimming area 1300 is defined, the length 1302 from the top of the tentative trimming area 1300 to the top of the image and the length 1303 from the bottom of the tentative trimming area 1300 to the bottom of the image are obtained. Furthermore, the length 1304 from the left end of the tentative trimming area 1300 to the left end of the image and the length 1305 from the right end of the tentative trimming area 1300 to the right end of the image are obtained. Then, the shortest length is obtained from among the lengths 1302 through 1305. The side corresponding to the shortest length obtained in this way is determined as the side to be the reference in scaling. Hereinafter, in the explanation of the present example, it is assumed that the shortest length is the length 1303.

The position of the bottom of the tentative trimming area 1300 is moved downward by the length 1303, and the position of the top of the tentative trimming area 1300 is moved upward by the length 1303. Here, the bottom of the tentative trimming area 1300 is at the same position as the bottom of the image, and the top of the tentative trimming area 1300 is inside the image area.

Next, the lengths of moving the left end and the right end of the tentative trimming area 1300 are calculated, based on the length 1303 and the aspect ratio of the slot. Since the length 1303 in the present example is the length for the longitudinal direction, the length for the transverse direction is calculated, based on the aspect ratio of the slot. For example, in a case where the length 1303 is 100 pixels and the aspect ratio of the slot is 1:2 (longitudinal to transverse), the length for the transverse direction can be obtained as 200 (=100×2±1) by calculation. The position of the left end of the tentative trimming area 1300 is moved leftward by the obtained length for the transverse direction, and the position of the right end of the tentative trimming area 1300 is moved rightward by the obtained length for the transverse direction. Here, the right end and left end of the tentative trimming area 1300 are definitely inside the image area. Based on the positions of the top, the bottom, the left end, and the right end of the tentative trimming area 1300 obtained above, the position (coordinates, or the like) of the trimming area can be obtained.

Figure 14A:
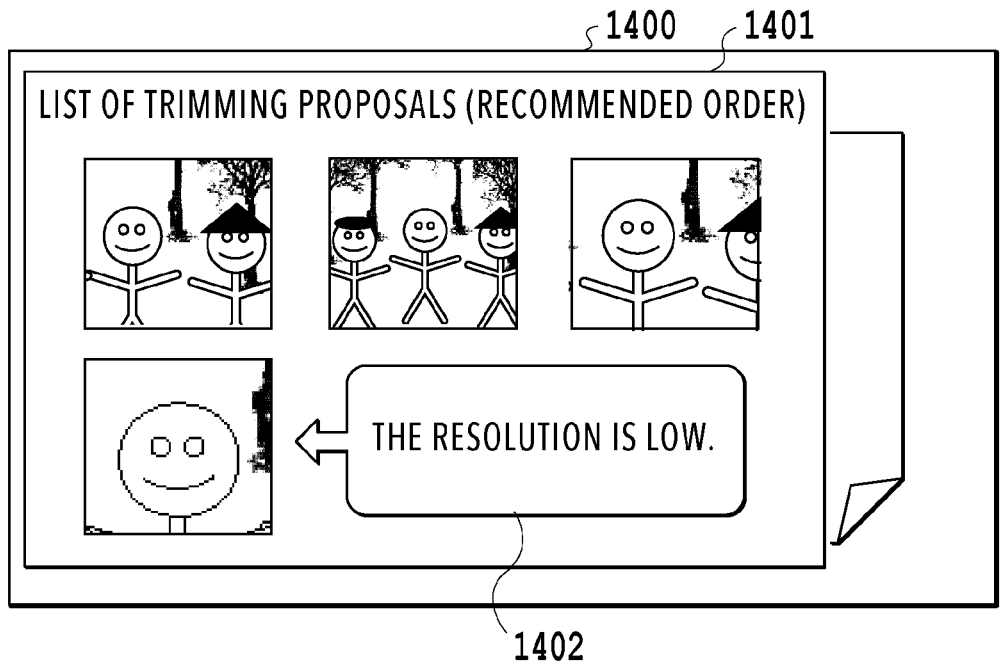
FIG. 14A is a UI diagram illustrating a specific example of presenting trimming proposals in an embodiment.
Figure 14B:
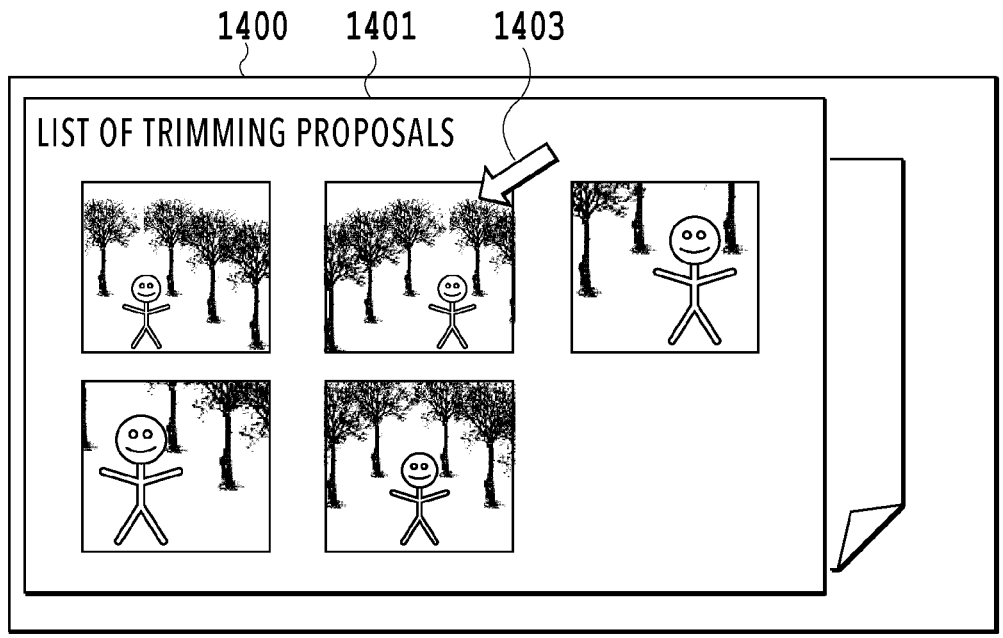
FIG. 14B is a UI diagram illustrating a specific example of presenting trimming proposals in an embodiment.

Now, the explanation is continued with reference to FIG. 2 again. In S205, the album creation application 50 lists the trimmed images obtained in S204 and presents the multiple trimmed images to the user as trimming proposals. FIGS. 14A and 14B are examples of a UI screen for presenting trimmed images to the user, in which a trimmed image list screen 1401 is displayed on an editing screen 1400. In a case where the sizes of the trimmed images are different, it is preferable to adjust the respective resolutions of the trimmed images to list all of the trimmed images fit frames of the same size, so that the appearance can be easily compared. Furthermore, in a case of presenting the multiple trimmed images, it is possible to add a priority or a warning, so as to assist the user in selecting a trimmed image. FIG. 14A illustrates a situation in which scores are given to the trimmed images in a predetermined method and the trimmed images are listed in the order based on the scores. Reference numeral 1402 denotes a warning displayed as an example (details of the scoring will be described later with reference to FIG. 15).

In S206, the album creation application 50 obtains a trimmed image according to the result of the user selecting one of the trimming proposals presented in S205. FIG. 14B illustrates a situation in which the trimmed images are listed on the editing screen 1400 and the user selects a desired trimmed image. Such a situation in which the trimmed images are listed in the frames of the same size on the trimmed image list screen 1401 and the user selects a desired trimmed image by use of a pointing device 1403 is illustrated.

In addition, from the presentation of the multiple trimmed images, which is performed in S205, the series of the present flow can be automatically performed. For example, it is also possible that the trimmed images obtained in S204 are analyzed and scored, so that the one with the highest score is adopted for the slot. In FIG. 15, an example of the scoring is illustrated. In the present case, after the point of interest is designated, the trimmed image of PLAN 1 having the highest score is automatically adopted for the slot 302.

Figure 16:
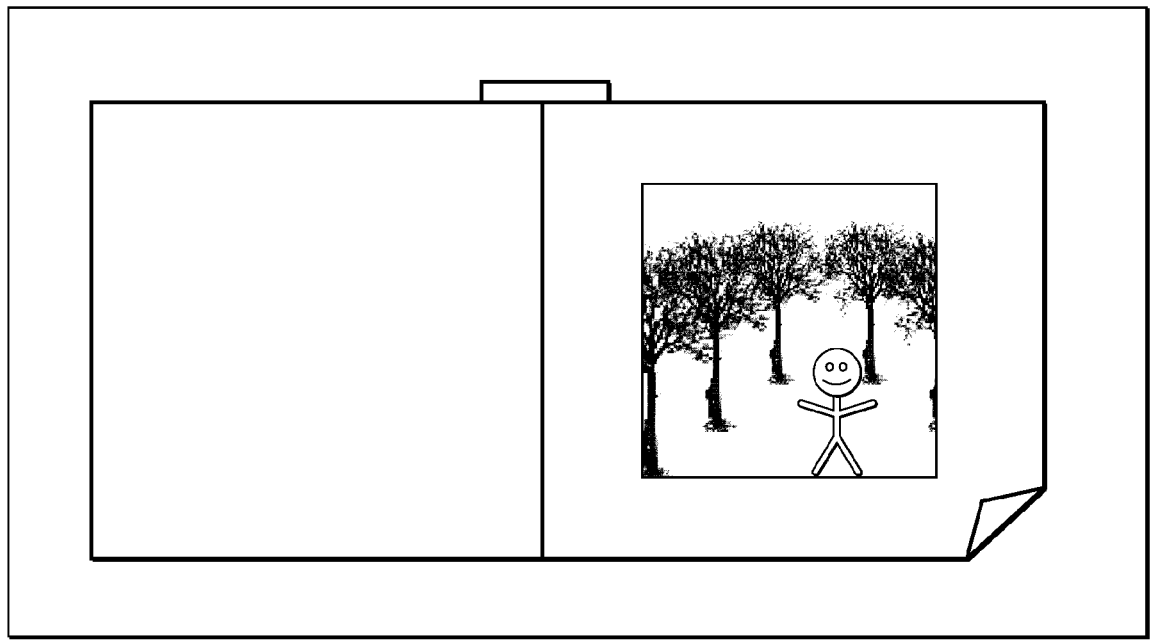
FIG. 16 is an explanatory diagram illustrating a specific example to which a trimming proposal is applied in an embodiment.

In S207, the album creation application 50 adopts the trimmed image selected in S206 for the slot. FIG. 16 is a diagram illustrating a situation in which the selected trimmed image is arranged in the slot 302 illustrated in FIG. 3.

In the present embodiment, by simply selecting an image to be arranged in a slot, designating a point of interest, and selecting desired one of trimming proposals, the user can perform trimming of the image with a desired composition. Note that the album creation application 50 may be a trimming application having a configuration for performing a procedure up to designating a point of interest for a selected image and presenting trimming proposals to the user.

Furthermore, although the composition pattern is selected in S203 after the point of interest is designated in S202 in the flowchart of FIG. 2, it is also possible to switch the order of S202 and S203, so that the point of interest is designated after the composition pattern is selected.

Second Embodiment

Figure 17:
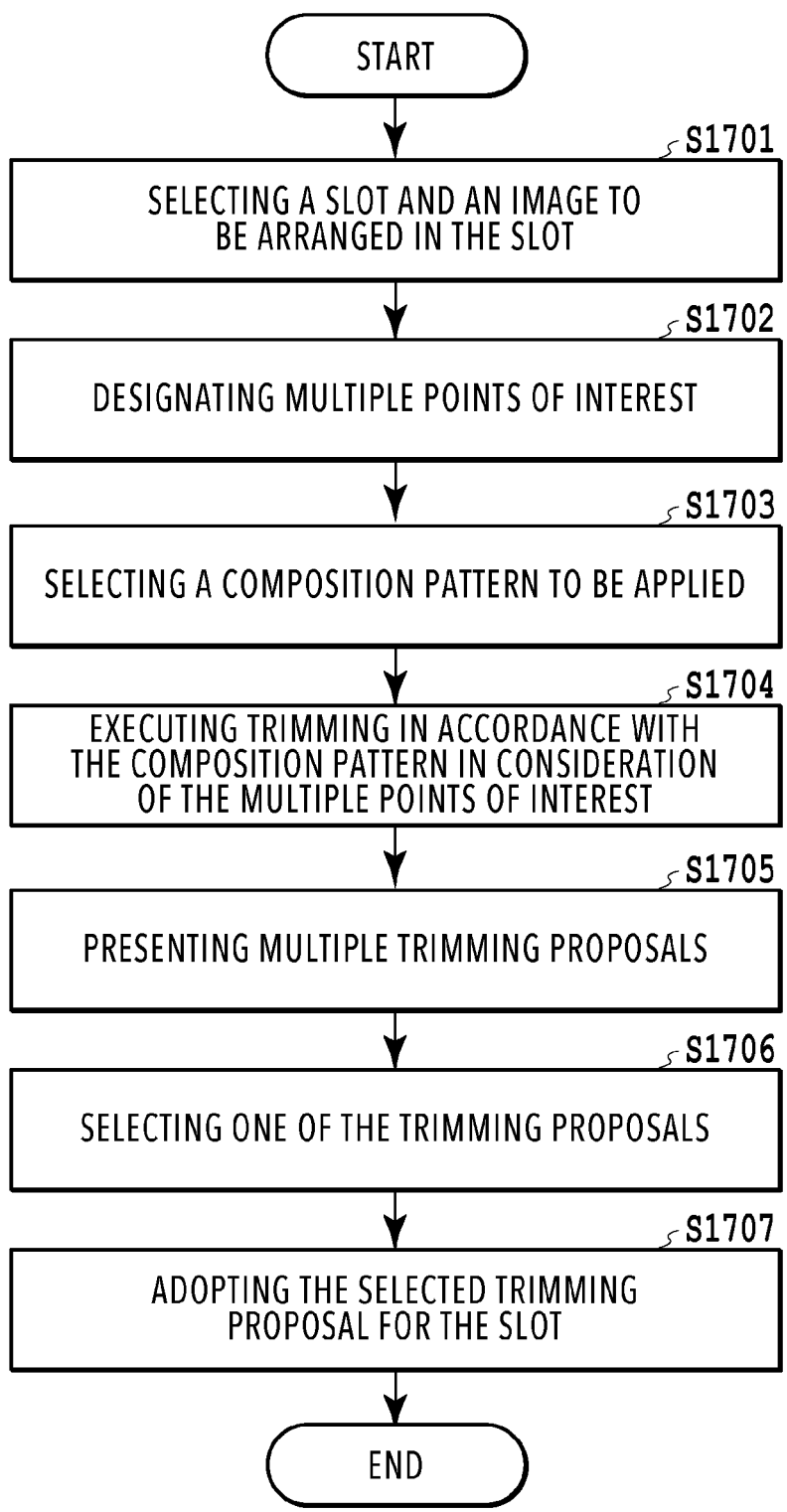
FIG. 17 is a flowchart for explaining processing for multiple points of interest in an embodiment.

In the present embodiment, trimming is performed with designation of multiple points of interest. For example, the use cases include a case in which the user sets multiple points of interest, a case in which a face recognition engine detects multiple faces and the multiple faces are set as points of interest, respectively. In FIG. 17, a flowchart of processing for presenting trimming proposals in a case where multiple points of interest are designated is illustrated.

In S1701, the album creation application 50 displays image data, to which trimming is performed, and a template, which includes a slot in which the image data is arranged, in a selectable manner, so that a slot and image data to be arranged in the slot are selected by use of the input device 107.

In S1702, the album creation application 50 obtains the position information of multiple points of interest in the image to be arranged in the slot. For example, the user designates multiple points of interest such as the center of an object and the center of the face of a person to be a main target in trimming. Alternatively, a face recognition engine may be used to automatically detect multiple faces, so that the centers of the multiple faces are set as the points of interest, respectively.

In S1703, the album creation application 50 presents composition patterns applicable to the image with designation of the points of interest to the user, and the album creation application 50 obtains the composition pattern to be applied, which is selected by the user from among the presented composition patterns. Here, the method described in S203 of the first embodiment can be adopted.

In S1704, the album creation application 50 performs trimming based on the multiple points of interest designated in S1702 and the composition pattern selected in S1703.

Here, in FIG. 18, conditions for determining the correspondence between points of interest and the positions of intersection points in a rule-of-thirds composition are illustrated. First, the album creation application 50 selects two points that are closest to the edge of the image from among multiple designated points of interest. Next, two intersection points are selected from among the four intersection points of the rule-of-thirds composition. The longitudinal length and the transverse length between the two selected points of interest are calculated, and the ratio of the respective lengths is obtained. In a case where the longitudinal/transverse ratio, which is the ratio of the longitudinal length to the transverse length between the two selected points of interest, is ½ or more and less than ⅔, the intersection points to be overlapped with the points of interest in the rule-of-thirds composition become the upper left one and the lower right one or the lower left one and the upper right one. Of the two points of interest, in a case where the longitudinal position of the point of interest on the left side is at an upper level or at the same level compared to the point of interest on the right side, the intersection points become the upper left one and the lower right one (the first row in FIG. 18), and, in a case where the longitudinal position of the point of interest on the left side is at a lower level compared to the point of interest on the right side, the intersection points become the lower left one and the upper right one (the second row in FIG. 18).

Furthermore, in a case where the longitudinal/transverse ratio, which is the ratio of the longitudinal length to the transverse length between the points of interest, is less than ½, the intersection points become the upper left one and the upper right one or the lower left one and the lower right one. In a case where the middle position between the longitudinal positions of the two points of interest is in the upper half area (including exactly at a half position) of the image, the intersection points become the upper left one and the upper right one (the third row in FIG. 18), and, in a case where the middle position between the longitudinal positions of the two points of interest is in the lower half area (not including exactly at a half position) of the image, the intersection points become the lower left one and the lower right one (the fourth row in FIG. 18).

Furthermore, in a case where the longitudinal/transverse ratio, which is the ratio of the longitudinal length to the transverse length between the points of interest, is ⅔ or more, the intersection points become the upper left one and the lower left one or the upper right one and the lower right one. In a case where the middle position between the transverse positions of the two points of interest is in the left half area (including exactly at a half position) of the image, the intersection points become the upper left one and the lower left one (the fifth row in FIG. 18), and, in a case where the middle position between the transverse positions of the two points of interest is in the right half area (not including exactly at a half position) of the image, the intersection points become the upper right one and the lower right one (the sixth row in FIG. 18).

As described above, in a case where multiple points of interest are designated, the number of trimming proposals that can be presented for one composition pattern is less than a case in which there is one point of interest.

In FIGS. 19A through 19D, specific examples of trimming using a rule-of-thirds composition in a case where two points of interest are designated are illustrated.

Figure 19A:
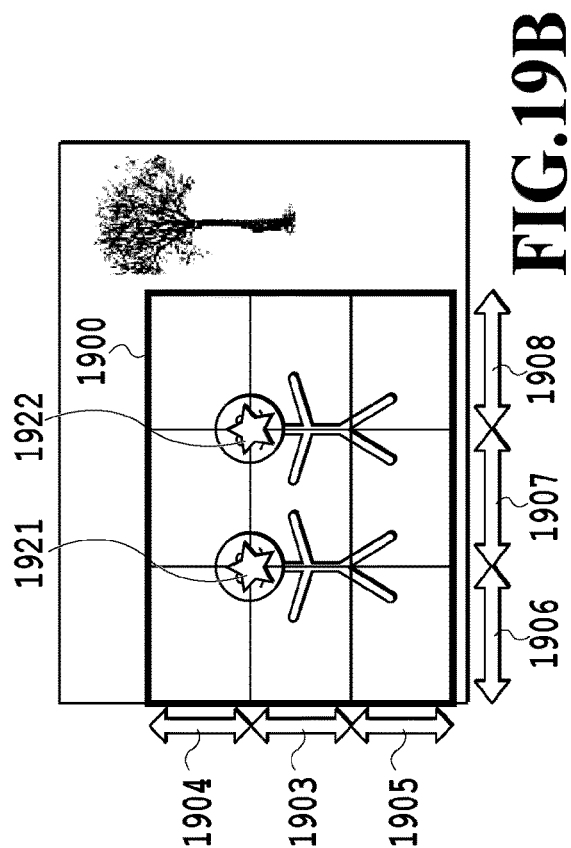
FIG. 19A is an explanatory diagram for explaining processing for multiple points of interest in an embodiment.
Figure 20:
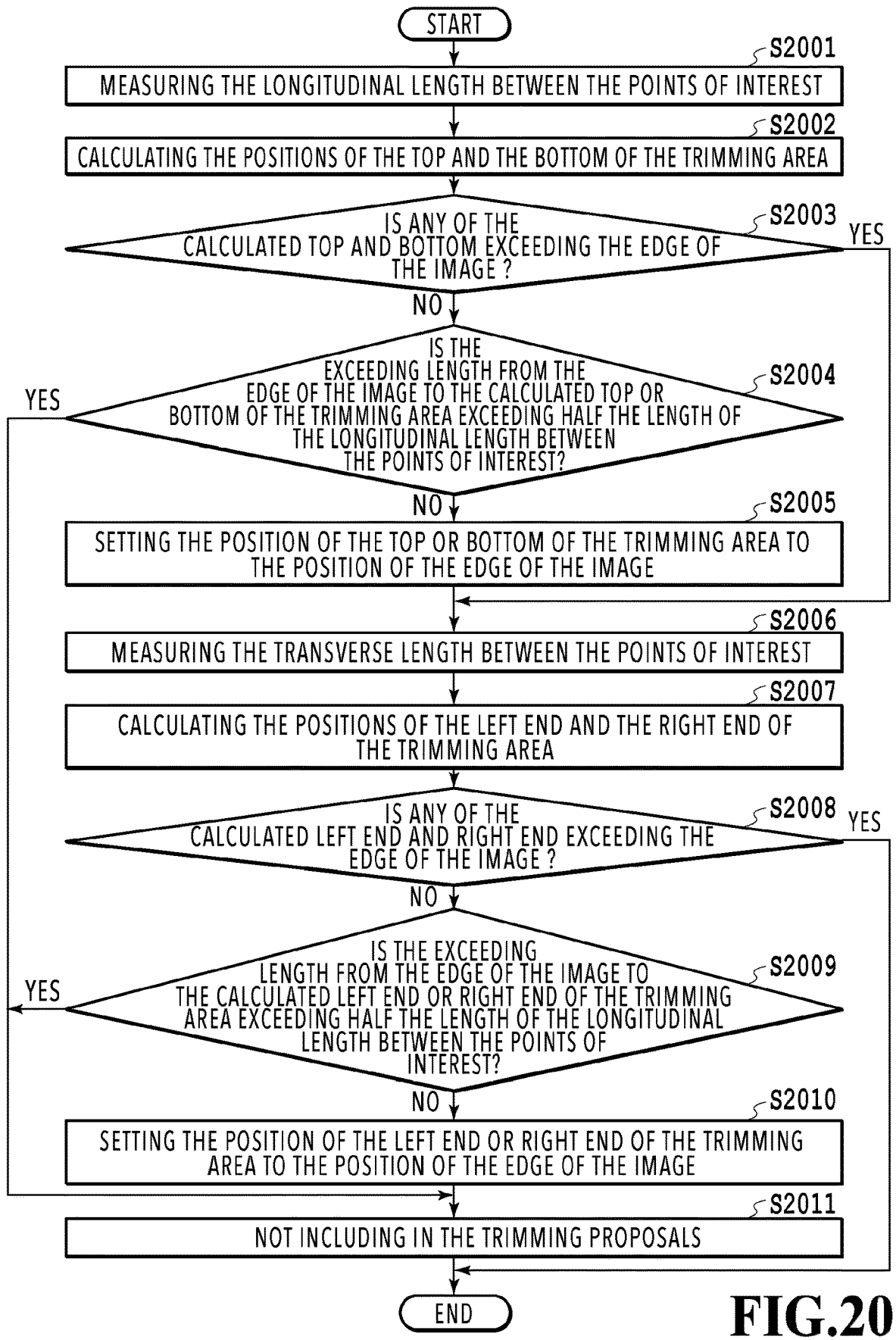
FIG. 20 is a flowchart for explaining processing for multiple points of interest in an embodiment.

With reference to FIG. 19A, an explanation is given of a specific example in a case where the intersection points overlapped with the points of interest in a rule-of-thirds composition are the upper left one and the lower right one. FIG. 20 is a flowchart of processing for obtaining the positions of the top, the bottom, the left end, and the right end of the trimming area in such a case where points of interest are arranged as in FIG. 19A. Note that the algorithm illustrated in FIG. 20 can be similarly applied to such a case where the intersection points are the lower left one and the upper right one.

In 2001, the album creation application 50 measures the longitudinal length 1903 between the two designated points of interest 1911 and 1912.

In S2002, based on the length 1903, the album creation application 50 obtains the length 1904 from the point of interest 1911 to the top of the trimming area 1900 and the length 1905 from the point of interest 1912 to the bottom of the trimming area 1900. The length 1903 obtained in S2001 corresponds to one third of the longitudinal length of the trimming area 1900 in a rule-of-thirds composition. Therefore, since the length 1904 from the point of interest 1911 to the top of the trimming area 1900 and the length 1905 from the point of interest 1912 to the bottom of the trimming area 1900 are obtained, it is possible to calculate the positions of the top and the bottom of the trimming area 1900.

In S2003, the album creation application 50 determines whether any of the calculated top and bottom of the trimming area 1900 is exceeding the edge of the image. In a case where none of the top and bottom of the trimming area 1900 is exceeding the edge of the image, the processing proceeds to S2006, and, in a case where any of the top and bottom of the trimming area 1900 is exceeding the edge of the image, the processing proceeds to S2004.

In S2004, the album creation application 50 determines whether the exceeding length from the edge of the image to the top or bottom of the trimming area 1900 is exceeding half the length of the length 1903. Specifically, whether the exceeding length from the top of the image to the top of the trimming area 1900 or the exceeding length from the bottom of the image to the bottom of the trimming area 1900 is exceeding half the length of the length 1903 is determined. In a case where the exceeding length from the edge of the image to the top or the bottom of the trimming area 1900 is exceeding half the length of the length 1903, the processing proceeds to S2011. In a case where the exceeding length from the edge of the image to the top or the bottom of the trimming area 1900 is not exceeding half the length of the length 1903, the processing proceeds to S2005.

In S2005, the album creation application 50 sets the position of the top of the trimming area 1900 to the top of the image, and, in the case where the bottom of the trimming area 1900 is exceeding the bottom of the image, the album creation application 50 sets the position of the bottom of the trimming area 1900 to the bottom of the image. In these cases, the points of interest 1911 and 1912 are not completely overlapped with the intersection points of the rule-of-thirds composition, which makes misalignment therebetween. The misalignment corresponds to the exceeding length from the edge of the image to the top or the bottom of the trimming area 1900, which is the target of determination in S2004. In a case where the lengths of the mis-alignment are long, it cannot be said that the composition pattern is applied. Therefore, in S2004, in a case where the lengths of the misalignment are not within a predetermined range, that is, in a case where the length is exceeding half the length of the length 1903, the processing will be cancelled, so that the present way of trimming is not included in the trimming proposals.

Next, in 2006, the album creation application 50 measures the transverse length 1907 between the two designated points of interest 1911 and 1912.

In S2007, based on the length 1907, the album creation application 50 obtains the length 1906 from the point of interest 1911 to the left end of the trimming area 1900 and the length 1908 from the point of interest 1912 to the right end of the trimming area 1900. The length 1907 corresponds to one third of the transverse length of the trimming area 1900 in a rule-of-thirds composition. Therefore, since the length 1906 from the point of interest 1911 to the left end of the trimming area 1900 and the length 1908 from the point of interest 1912 to the right end of the trimming area 1900 are obtained, it is possible to calculate the positions of the left end and the right end of the trimming area 1900.

In S2008, the album creation application 50 determines whether any of the calculated left end and right end of the trimming area 1900 is exceeding the edge of the image. In a case where none of the left end and right end of the trimming area 1900 is exceeding the edge of the image, the processing will end, and, in a case where any of the left end and right end of the trimming area 1900 is exceeding the edge of the image, the processing proceeds to S2009.

In S2009, the album creation application 50 determines whether the exceeding length from the edge of the image to the left end or right end of the trimming area 1900 is exceeding half the length of the length 1903. Specifically, whether the exceeding length from the left end of the image to the left end of the trimming area 1900 or the exceeding length from the right end of the image to the right end of the trimming area 1900 is exceeding half the length of the length 1903 is determined. In a case where the exceeding length from the edge of the image to the left end or the right end of the trimming area 1900 is exceeding half the length of the length 1903, the processing proceeds to S2011. In a case where the exceeding length from the edge of the image to the left end or the right end of the trimming area 1900 is not exceeding half the length of the length 1903, the processing proceeds to S2010.

In S2010, in a case where the left end of the trimming area 1900 is exceeding the left end of the image, the album creation application 50 sets the position of the left end of the trimming area 1900 to the left end of the image. On the other hand, in a case where the right end of the trimming area 1900 is exceeding the right end of the image, the position of the right end of the trimming area 1900 is set to the right end of the image. In these cases, the points of interest 1911 and 1912 are not completely overlapped with the intersection points of the rule-of-thirds composition, which makes misalignment therebetween. The lengths of the misalignment correspond to the exceeding length from the edge of the image to the left end or the right end of the trimming area 1900, which is the target of determination in S2009. In a case where the lengths of the misalignment are long, it cannot be said that the composition pattern is applied. Therefore, in S2009, in a case where the lengths of the misalignment are longer than a predetermined length, that is, in a case where the length is exceeding half the length of the length 1903, the processing will be cancelled, so that the present way of trimming is not included in the trimming proposals.

Figure 19B:
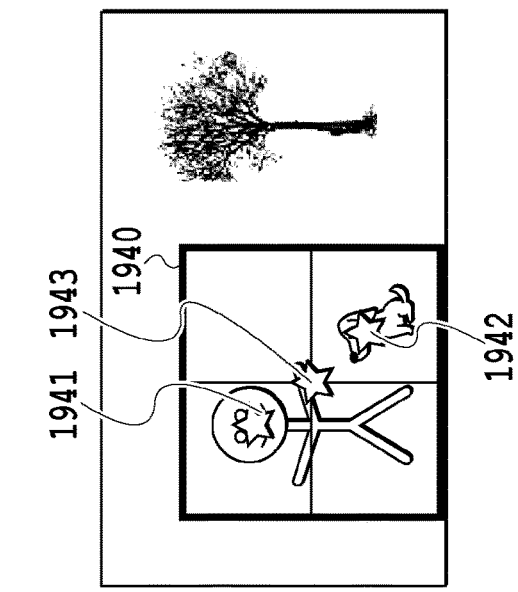
FIG. 19B is an explanatory diagram for explaining processing for multiple points of interest in an embodiment.

With reference to FIG. 19B, an explanation is given of a specific example in a case where the intersection points overlapped with the points of interest in a rule-of-thirds composition are the upper left one and the upper right one. Note that, in such a case as illustrated in FIG. 19B, the arrangement of the points of interest can be obtained by the same algorithm as the flowchart illustrated in FIG. 20 by changing a part of the flowchart. Further, the algorithm can be similarly applied to a case in which the intersection points are the lower left one and the lower right one. First, the longitudinal ends, that is, the top and bottom in S2001 through S2005 are changed to the transverse ends, that is, the left end and right end, so as to determine the position of the trimming area in the transverse direction or to determine not to include the present way of trimming in the trimming proposals. The specific explanation is as follows.

First, the transverse length 1907 from the point of interest 1921 to the point of interest 1922 is measured. Since the length 1907 is one third of the transverse length of the trimming area 1900, the length 1906 from the point of interest 1921 to the left end of the trimming area 1900 and the length 1908 from the point of interest 1922 to the right end of the trimming area 1900 can be obtained. Therefore, it is possible to calculate the positions of the left end and the right end of the trimming area 1900.

Here, in a case where the left end of the trimming area 1900 is exceeding the left end of the image, the position of the left end of the trimming area 1900 is set to the left end of the image. Furthermore, in a case where the right end of the trimming area 1900 is exceeding the right end of the image, the position of the right end of the trimming area 1900 is set to the right end of the image. In these cases, the points of interest are not completely overlapped with the intersection points of the rule-of-thirds composition, which makes misalignment. In a case where the lengths of the misalignment are long, it cannot be said that the composition pattern is applied. Therefore, the processing will be cancelled, so that the present way of trimming is not included in the trimming proposals. Specifically, in a case where the exceeding length from the left end of the image to the calculated left end of the trimming area 1900 or the exceeding length from the right end of the image to the calculated right end of the trimming area 1900 is exceeding half the length of the length 1907, the processing will be cancelled.

Next, the transverse ends, that is, the left end and right end in S2006 through S2010 are changed to the longitudinal ends, that is, the top and bottom. Further, the length in S2006 is changed so as to be obtained based on the length 1907 and the aspect ratio of the slot. The position of the trimming area in the longitudinal direction may be determined, or it may be determined that the present way of trimming is not to be included in the trimming proposals. The specific explanation is as follows.

For example, in a case where the length 1907 (corresponding to the transverse length) is 1000 pixels and the aspect ratio of the slot is 1:2 (longitudinal to transverse), the length 1903 can be calculated as 500 (=1000×1÷2). Since the length 1903 is equal to the length 1904 and the length 1905, the positions of the top and the bottom of the trimming area can be calculated. Here, in a case where the top of the trimming area is exceeding the top of the image, the position of the top of the trimming area is set to the top of the image. Furthermore, in a case where the bottom of the trimming area is exceeding the bottom of the image, the position of the bottom of the trimming area is set to the bottom of the image. In these cases, the points of interest are not completely overlapped with the intersection points of the rule-of-thirds composition, which makes misalignment. In a case where the lengths of the misalignment are long, it cannot be said that the composition pattern is applied. Therefore, the processing will be cancelled, so that the present way of trimming is not included in the trimming proposals. Specifically, in a case where the exceeding length from the top of the image to the calculated top of the trimming area or the exceeding length from the bottom of the image to the calculated bottom of the trimming area is exceeding half the length of the length 1907, the processing will be cancelled.

Figure 19C:
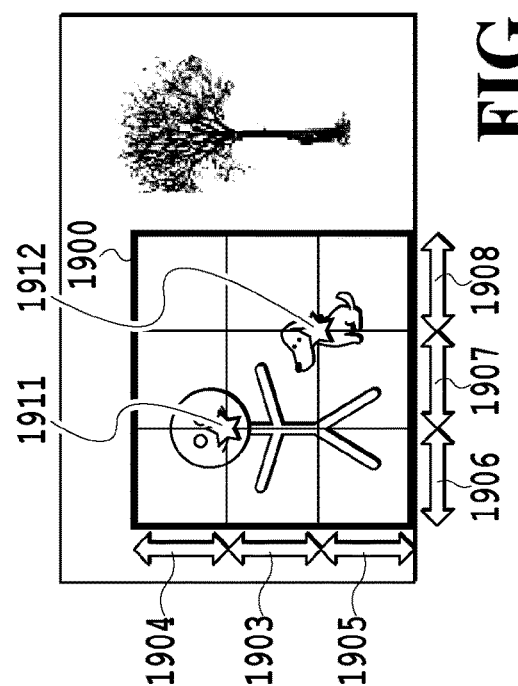
FIG. 19C is an explanatory diagram for explaining processing for multiple points of interest in an embodiment.
Figure 19D:
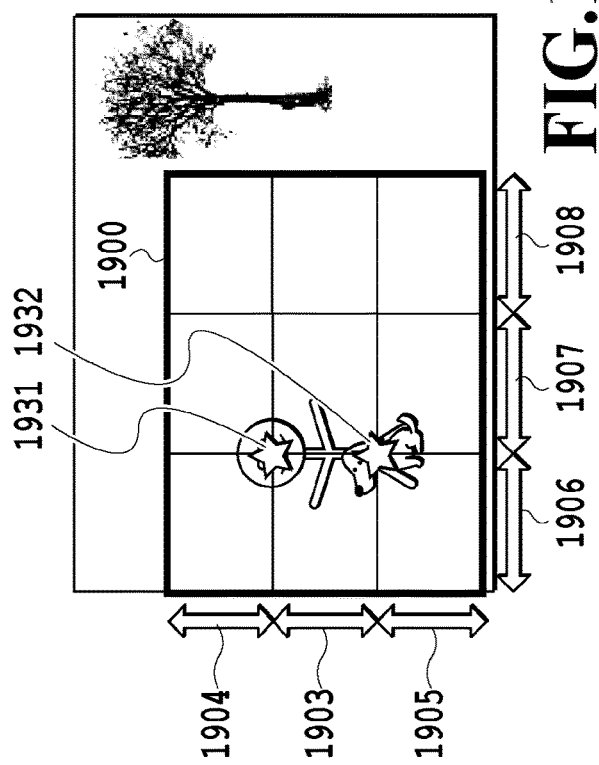
FIG. 19D is an explanatory diagram for explaining processing for multiple points of interest in an embodiment.

With reference to FIG. 19C, an explanation is given of a specific example in a case where the intersection points overlapped with the points of interest in a rule-of-thirds composition are the upper left one and the lower left one. Note that, in such a case as illustrated in FIG. 19C, the arrangement of the points of interest can be obtained by the same algorithm as the flowchart illustrated in FIG. 20 by changing a part of the flowchart. Further, the algorithm can be similarly applied to a case in which the intersection points are the upper right one and the lower right one. S2001 through S2005 remain unchanged from FIG. 20. The specific explanation is as follows.

First, the longitudinal length 1903 from the point of interest 1931 to the point of interest 1932 is measured. Since the length 1903 is one third of the longitudinal length of the trimming area, the length 1904 from the point of interest 1931 to the top of the trimming area and the length 1905 from the point of interest 1932 to the bottom of the trimming area can be obtained. Therefore, it is possible to calculate the position of the top and the bottom of the trimming area 1900.

Here, in the case where the top of the trimming area 1900 is exceeding the top of the image, the position of the top of the trimming area 1900 is set to the top of the image. Furthermore, in the case where the bottom of the trimming area 1900 is exceeding the bottom of the image, the position of the bottom of the trimming area 1900 is set to the bottom of the image. In these cases, the points of interest are not completely overlapped with the intersection points of the rule-of-thirds composition, which makes misalignment. In a case where the lengths of the misalignment are long, it cannot be said that the composition pattern is applied. Therefore, the processing will be cancelled, so that the present way of trimming is not included in the trimming proposals. Specifically, in a case where the exceeding length from the top of the image to the calculated top of the trimming area 1900 or the exceeding length from the bottom of the image to the calculated bottom of the trimming area 1900 is exceeding half the length of the length 1904, the processing will be cancelled.

Next, the measurement of the length in S2006 is changed such that the length is obtained based on the length 1903 and the aspect ratio of the slot. The specific explanation is as follows.

For example, in a case where the length 1903 (corresponding to the longitudinal length) is 1000 pixels and the aspect ratio of the slot is 1:2 (longitudinal to transverse), the length 1907 can be calculated as 2000 (=1000×2÷1). Since the length 1907 is equal to the length 1906 and the length 1908, the positions of the left end and the right end of the trimming area can be calculated. Here, in the case where the left end of the trimming area is exceeding the left end of the image, the position of the left end of the trimming area is set to the left end of the image. Furthermore, in a case where the right end of the trimming area is exceeding the right end of the image, position of the right end of the trimming area is set to the right end of the image. In these cases, the points of interest are not completely overlapped with the intersection points of the rule-of-thirds composition, which makes misalignment. In a case where the lengths of the misalignment are long, it cannot be said that the composition pattern is applied. Therefore, the processing will be cancelled, so that the present way of trimming is not included in the trimming proposals. Specifically, in a case where the exceeding length from the left end of the image to the calculated left end of the trimming area or the exceeding length from the right end of the image to the calculated right end of the trimming area is exceeding half the length of the length 1907, the processing will be cancelled.

Next, an explanation is given of a specific example in a case where multiple points of interest are designated in a central composition. First, the album creation application 50 calculates the center position of the multiple points of interest. Specifically, there is a method in which the coordinate positions of the respective points of interest are obtained and the coordinates of the average values thereof are used as the center position of the multiple points of interest. The subsequent processing will be explained with reference to FIG. 19D. Reference numerals 1941 and 1942 denote designated points of interest, respectively. Reference numeral 1943 denotes the center position of the points of interest 1941 and 1942. In the following, the center position is set as the point of interest, and the trimming area can be obtained by the same method as the method explained with reference to FIGS. 11, 12, and 13 in the first embodiment.

Now, the explanation is continued with reference to FIG. 17 again. The subsequent processes, that is, S1705, S1706, and S1707 are the same as S205, S206, and S207 explained in the first embodiment.

Third Embodiment

Figure 21:
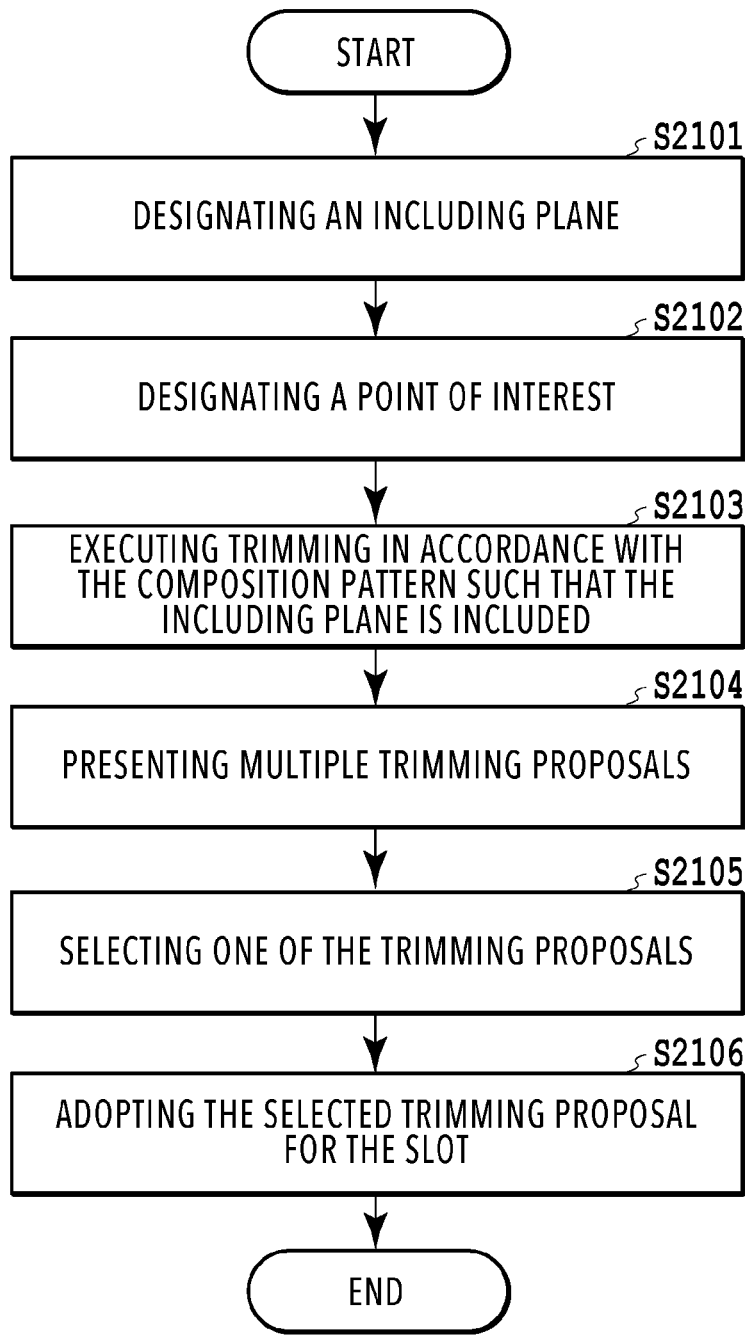
FIG. 21 is a flowchart for explaining processing using an including plane in an embodiment.

In the present embodiment, an area, not a point, is designated as a main target of trimming. In FIG. 21, a flowchart of processing for presenting trimming proposals in a case where an area is designated as a target of trimming is illustrated.

In S2101, the album creation application 50 obtains the position information of an area including a trimming target in the image to be arranged in the slot. The designated area is hereinafter referred to as an including plane. A specific example in which the user designates an including plane will be explained with reference to FIGS. 22A and 22B.

Figure 22A:
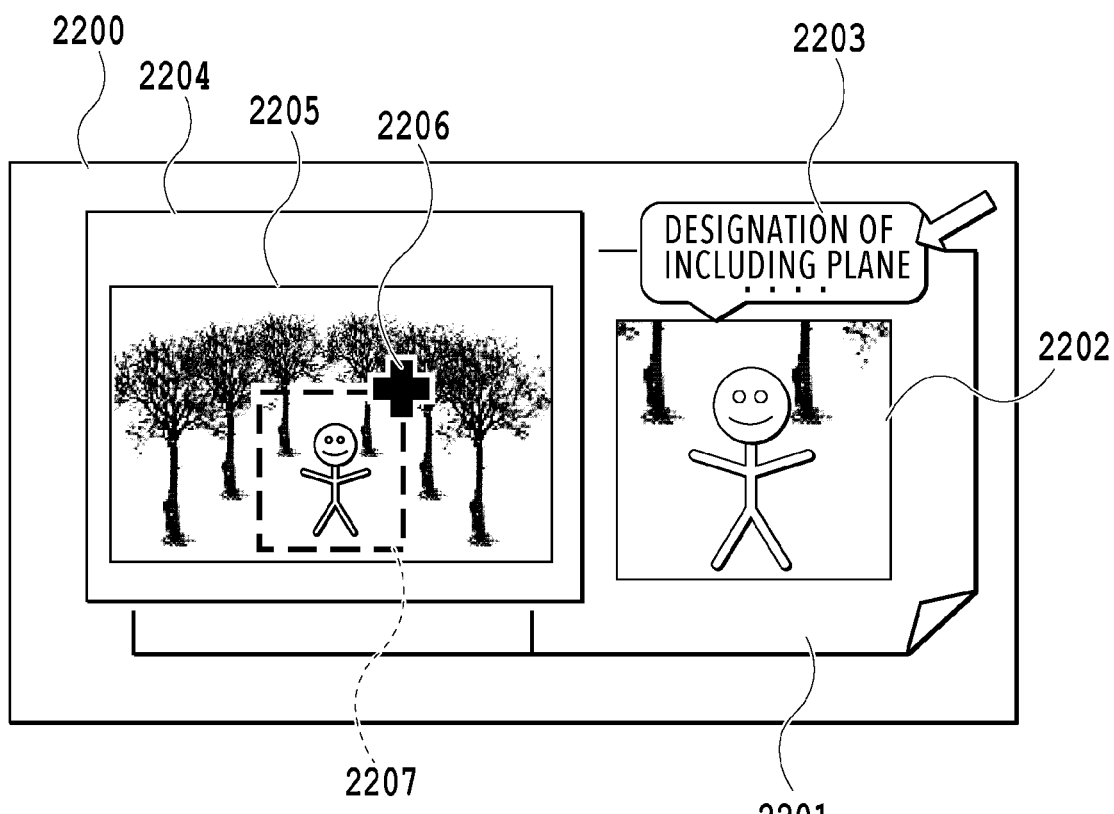
FIG. 22A is an explanatory diagram for explaining processing using an including plane in an embodiment.

In FIG. 22A, reference numeral 2200 denotes a screen for editing an album, and reference numeral 2201 denotes a template of the album. Reference numeral 2202 denotes a slot of the template 2201, and a situation in which an image trimmed down to an area including the entire body of a person is arranged in accordance with the shape of the slot 2202 is illustrated. It is possible for the user to designate an including plane for the image to be arranged in the slot 2202, so that the image to be arranged in the slot 2202 is trimmed to a good appearance. In a case where the user provides an instruction for designating an including plane by use of a pointer, or the like, on the menu 2203 where the user can provide an operation on a per slot basis, an including plane settings screen 2204 for setting an including plane in accordance with an instruction for designating an including plane will open. On the including plane settings screen 2204, the entire image of the image 2205 trimmed and arranged in the slot 2202 is displayed. The user designates an including plane for the image in the slot 2202 by indicating a rectangle of the including plane with the pointer 2206. Reference numeral 2207 denotes the rectangle of the including plane indicated by the user. Furthermore, the including plane 2207 may be automatically set instead of being designated by the user. For example, the area including all the faces detected by a face recognition engine may be set as the including plane 2207.

In S2102, the album creation application 50 sets one or more points of interest inside the area of the including plane 2207. The points of interest can be set by the method described in the first and second embodiments.

Figure 22B:
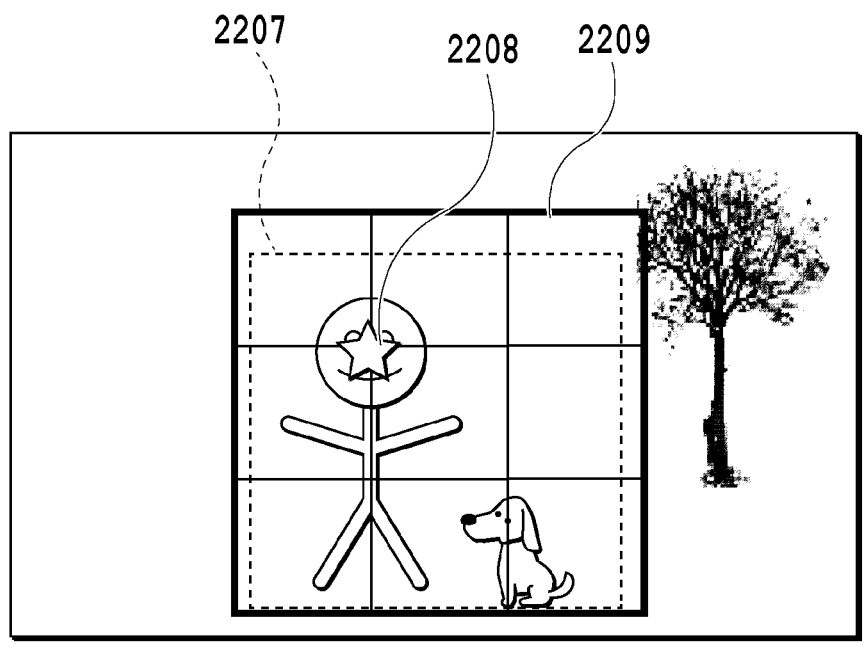
FIG. 22B is an explanatory diagram for explaining processing using an including plane in an embodiment.

In S2103, the album creation application 50 executes trimming in according to the composition pattern such that the including plane is included. Note that the composition pattern used in S2103 may be a composition pattern selected based on an instruction from the user as illustrated in FIG. 4 or a predetermined composition pattern. With reference to FIG. 22B, an explanation is given of a specific method for applying a rule-of-thirds composition including the including plane 2207. Reference numeral 2208 designates a designated point of interest, and, in the example illustrated in FIG. 22B, the point of interest 2208 is positioned at the upper left intersection point of the four intersection points in the rule-of-thirds composition. In a case where the including plane 2207 is designated, it is preferable that the trimming area 2209 has an area similar to the including plane 2207 as much as possible. Therefore, although the bottom line of the trimming area 2209 would be set to the bottom of the image according to the first embodiment, the bottom line of the trimming area 2209 is set to the bottom of the including plane 2207 in the present embodiment, so that the trimming area 2209 has an area similar to the including plane 2207.

Subsequently, the trimming area 2209 is obtained in a similar method as explained in the first embodiment. Since the trimming area 2209 needs to have the same aspect ratio as the slot 2202, there is such a case in which the including plane cannot be entirely included depending on the shapes of the including plane 2207 and the slot 2202. For example, in a case where a transversally long including plane 2207 is set on a transversally long image for a longitudinally long slot 2202, if trimming is performed such that the including plane 2207 is entirely included, there may be such a case in which the aspect ratio of the trimming area 2209 does not match the aspect ratio of the slot 2202. The method for dealing with such a case will be explained below.

The first method is to change the including plane 2207. Specifically, this dealing method is to reduce the transverse length of the including plane 2207 so that the aspect ratio of the trimming area 2209 matches the aspect ratio of the slot 2202.

The second method is to change the shape of the slot 2202. This dealing method is to perform trimming in as close aspect ratio of the slot 2202 as possible such that the including plane 2207 is entirely included and to match the shape of the slot 2202 with the trimmed image.

The subsequent processes, that is, S2104, S2105, and S2106 are the same as S205, S206, and S207 explained in the first embodiment.

Fourth Embodiment

Figure 23:
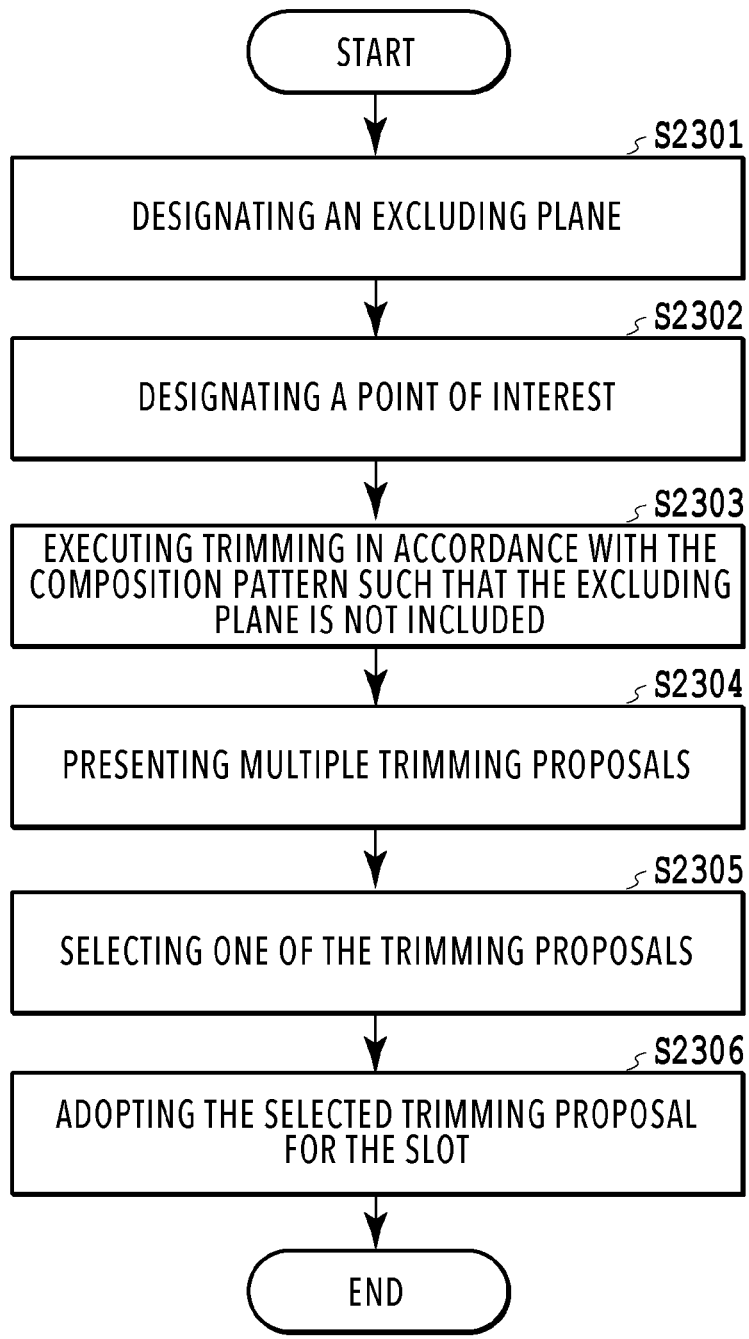
FIG. 23 is a flowchart for explaining processing using an excluding plane in an embodiment.
Figure 24:
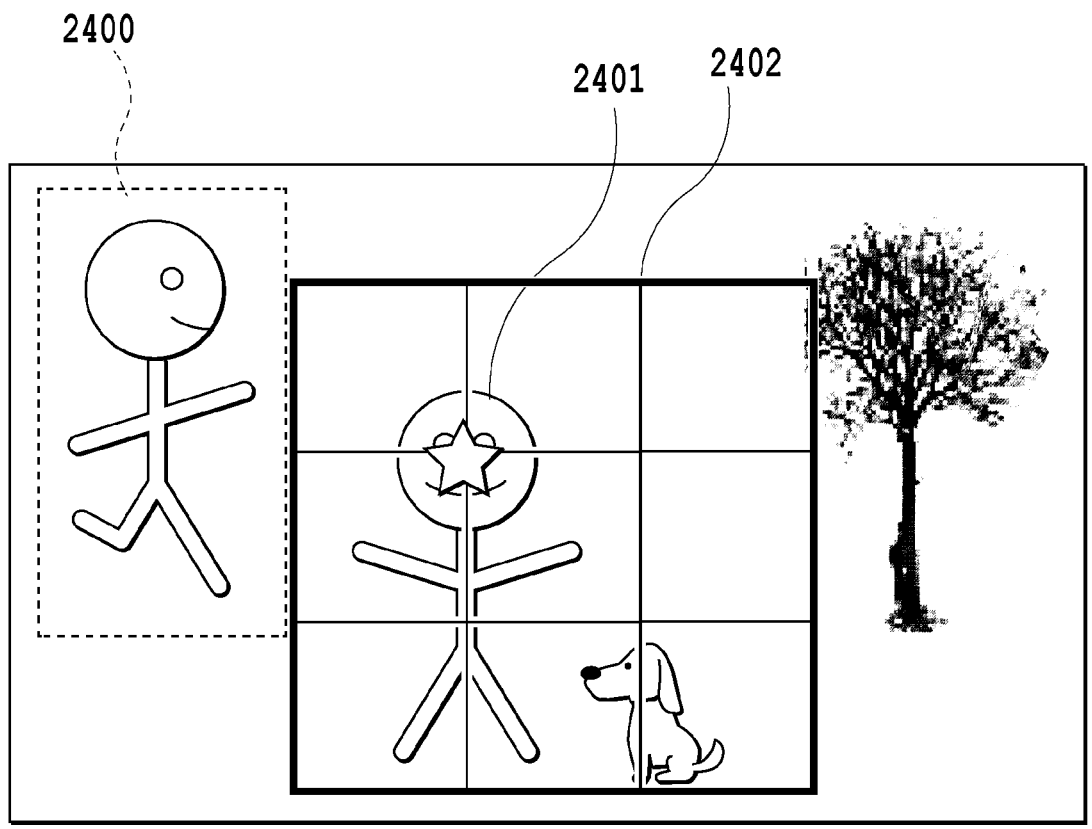
FIG. 24 is an explanatory diagram for explaining processing using an excluding plane in an embodiment.

In the present embodiment, in a case where trimming is performed, an area that is not to be included in the trimming area is designated. The area that is not to be included in the trimming area is hereinafter referred to as an excluding plane. FIG. 23 is a flowchart of processing for presenting trimming proposals in a case where an excluding plane is set. In addition, FIG. 24 is a diagram for explaining a specific method of applying a rule-of-thirds composition without including the excluding plane. Reference numeral 2400 denotes a designated excluding plane, and reference numeral 2401 denotes a designated point of interest.

In S2301, the album creation application 50 obtains the position information of the excluding plane 2400, which is an area not to be included in trimming the image to be arranged in the slot. The specific method is similar to the method of obtaining the position information of the area of the including plane explained in the third embodiment.

In S2302, the album creation application 50 sets one or more points of interest 2401 outside the area of the excluding plane 2400. The point of interest 2401 can be set by the method described in the first and second embodiments.

In S2303, the album creation application 50 executes trimming in according to the selected composition pattern such that the designated excluding plane 2400 is not included. Note that the composition pattern used in S2303 may be a composition pattern selected based on an instruction from the user as illustrated in FIG. 4 or a predetermined composition pattern. In the example illustrated in FIG. 24, the point of interest 2401 is positioned on the upper left intersection point of the four intersection points in the rule-of-thirds composition. Furthermore, in the present explanation, the trimming area 2402 is set to have the maximum area without including the excluding plane 2400. In the first embodiment, the left end line of the trimming area is set to the left end of the image in order to maximize the trimming area. However, in the present embodiment, in order to maximize the trimming area without including the excluding plane 2400, the position of the left end line of the trimming area 2402 is set to the right end of the excluding plane 2400. Subsequently, the trimming area 2402 is similarly obtained as in the first embodiment.

The subsequent processes, that is, S2304, S2305, and S2306 are the same as S205, S206, and S207 explained in the first embodiment.

Note that, although a rule-of-thirds composition and a central composition are taken as examples for explanation of the trimming process in the present disclosure, any composition may be used as long as the positional relationship between a point of interest and a trimming area is set as well as the relative positional relationship between the position where the point of interest is arranged in the applied composition and the outer frame of the composition. Therefore, the technology of the present disclosure can be applied to any composition other than the rule-of-thirds composition and the central composition as long as the relative positional relationship between the position where a point of interest is arranged and the outer frame of the composition can be obtained.

Furthermore, the term "trimming" in the present disclosure may be used for a case in which only a part of an image is cut out to generate an individual image or for a case in which only the cutout part is output. In the latter case, the term "trimming" in the present disclosure includes such a case in which another object on a layer above the image is superimposed on the area other than a trimming target area in the image, so that the area is not to be displayed and only the trimming target area is to be displayed, for example.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

It is possible to generate an image that is trimmed in a composition desired by the user.

This application claims the benefit of Japanese Patent Application No. 2019-128418 filed Jul. 10, 2019, which is hereby incorporated by reference wherein in its entirety.

What is claimed is:

1. An information processing method comprising:
a first designation step for designating a position of a point of interest in an image;
a determining step for determining a plurality of trimmed areas in the image, in accordance with the designated position of interest and a plurality of predetermined patterns;
a display control step for controlling a display unit to display a plurality of display items indicating the plurality of determined trimmed areas;
a selection step for selecting one of the displayed display items in accordance with input from a user; and
an arrangement step for arranging a trimmed area, corresponding to the selected display item, in the image in a slot of an album,
wherein each of the plurality of predetermined patterns indicates at least one position, in a trimmed area in the image, where the designated point of interest can be arranged, and wherein the plurality of trimmed areas are determined such that, in each of the plurality of trimmed area, the designated position of the point of interest matches a position among the at least one position indicated by each of the plurality of predetermined patterns.

2. The information processing method according to claim 1,
wherein, in the determining step, the plurality of trimmed areas are determined such that the point of interest is positioned within the at least one position indicated by each of the plurality of predetermined patterns.

3. The information processing method according to claim 2,
wherein, in the determining step, each of the plurality of predetermined patterns indicates, as the at least one position, at least one intersection point of auxiliary lines determined for each of the plurality of predetermined patterns.

4. The information processing method according to claim 2,
wherein, in the determining step, in a case where a plurality of points of interest are designated, the plurality of trimmed areas are determined such that a center position of the plurality of points of interest is positioned within a predetermined range from the at least one position indicated by each of the plurality of predetermined patterns.

5. The information processing method according to claim 1,
wherein, in the first designation step, the position of the point of interest is designated in accordance with input from the user.

6. The information processing method according to claim 1, further comprising
a second designation step for designating a position of an outer peripheral edge of an including area of the image to be included in the trimmed area,
wherein, in the determining step, the trimmed area is determined so that the including area is included in the trimmed area.

7. The information processing method according to claim 6,
wherein, in the second designation step, the position of the including area is designated in accordance with input from the user.

8. The information processing method according to claim 1, further comprising
a third designation step for designating a position of an outer peripheral edge of an excluding area of the image not to be included in the trimmed area,
wherein, in the determining step, the plurality of trimmed areas are determined so that the excluding area is not included in the trimmed area.

9. The information processing method according to claim 8,
wherein, in the third designation step, the position of the excluding area is designated in accordance with input from the user.

10. The information processing method according to claim 1,
wherein, in the determining step, the plurality of trimmed areas are determined with an aspect ratio of the slot.

11. The information processing method according to claim 1, further comprising a selection step for selecting the plurality of predetermined patterns, in accordance with input from the user.

12. A non-transitory computer-readable storage medium storing a program that causes a computer to function as an apparatus carrying out a method comprising:
a first designation step for designating a position of a point of interest in an image;
a determining step for determining a plurality of trimmed areas in the image, in accordance with the designated position of interest and a plurality of predetermined patterns;
a display control step for controlling a display unit to display a plurality of display items indicating the plurality of determined trimmed areas;
a selection step for selecting one of the displayed display items in accordance with input from a user; and
an arrangement step for arranging a trimmed area, corresponding to the selected display item, in the image in a slot of an album,
wherein each of the plurality of predetermined patterns indicates at least one position, in a trimmed area in the image, where the designated point of interest can be arranged, and wherein the plurality of trimmed areas are determined such that, in each of the plurality of trimmed area, the designated position of the point of interest matches a position among the at least one position indicated by each of the plurality of predetermined patterns.

13. An information processing apparatus comprising:
a first designation unit configured to designate a position of a point of interest in an image;
a determining unit configured to determine a plurality of trimmed areas in the image, in accordance with the designated position of interest and a plurality of predetermined composition patterns;
a display control unit configured to control a display unit to display a plurality of display items indicating the plurality of determined trimmed areas;
a selection unit configured to select one of the displayed display items in accordance with input from a user; and
an arrangement unit configured to arrange a trimmed area, corresponding to the selected display item, in the image in a slot of an album,
wherein each of the plurality of predetermined patterns indicates at least one position, in a trimmed area in the image, where the designated point of interest can be arranged, and
wherein the plurality of trimmed areas are determined such that, in each of the plurality of trimmed area, the designated position of the point of interest matches a position among the at least one position indicated by each of the plurality of predetermined patterns.

* * * * *